United States Patent
Meuter et al.

(10) Patent No.: US 12,352,849 B2
(45) Date of Patent: Jul. 8, 2025

(54) METHODS AND SYSTEMS FOR DETECTION OF OBJECTS IN A VICINITY OF A VEHICLE

(71) Applicant: Aptiv Technologies AG, Schaffhausen (CH)

(72) Inventors: Mirko Meuter, Erkrath (DE); Jittu Kurian, Wuppertal (DE); Yu Su, Wuppertal (DE); Jan Siegemund, Cologne (DE); Zhiheng Niu, Wuppertal (DE); Stephanie Lessmann, Erkrath (DE); Saeid Khalili Dehkordi, Berlin (DE); Florian Kästner, Bochum (DE); Igor Kossaczky, Wuppertal (DE); Sven Labusch, Cologne (DE); Arne Grumpe, Essen (DE); Markus Schoeler, Wuppertal (DE); Moritz Luszek, Detmold (DE); Weimeng Zhu, Wuppertal (DE); Adrian Becker, Leverkusen (DE); Alessandro Cennamo, Wuppertal (DE); Kevin Kollek, Wuppertal (DE); Marco Braun, Koblenz (DE); Dominic Spata, Witten (DE); Simon Roesler, Neuss (DE)

(73) Assignee: Aptiv Technologies AG, Schaffhausen (CH)

( * ) Notice: Subject to any disclaimer, the term of this patent is extended or adjusted under 35 U.S.C. 154(b) by 74 days.

(21) Appl. No.: 17/384,493

(22) Filed: Jul. 23, 2021

(65) Prior Publication Data
US 2022/0026568 A1    Jan. 27, 2022

(30) Foreign Application Priority Data

Jul. 24, 2020 (EP) ...................................... 20187674
Feb. 24, 2021 (EP) ...................................... 21159039

(51) Int. Cl.
*G01S 13/931* (2020.01)
*B60W 60/00* (2020.01)
(Continued)

(52) U.S. Cl.
CPC ......... *G01S 13/931* (2013.01); *B60W 60/001* (2020.02); *G01S 7/41* (2013.01);
(Continued)

(58) Field of Classification Search
CPC ........ G01S 13/931; G01S 7/41; G01S 13/865; G01S 13/867; G01S 7/2955; G01S 13/87;
(Continued)

(56) References Cited

U.S. PATENT DOCUMENTS 6,873,251 B2   3/2005   Schiffmann et al.
9,983,301 B2   5/2018   Liu et al.
(Continued)

FOREIGN PATENT DOCUMENTS

CN   111201451 A   5/2020
EP   3702802 A1    9/2020
(Continued)

OTHER PUBLICATIONS

"Extended European Search Report", EP Application No. 20205146. 2, Apr. 26, 2021, 8 pages.
(Continued)

*Primary Examiner* — Ig T An
(74) *Attorney, Agent, or Firm* — Harness, Dickey & Pierce, P.L.C.

(57) ABSTRACT

A computer implemented method for detection of objects in a vicinity of a vehicle comprises the following steps carried out by computer hardware components: acquiring radar data from a radar sensor; determining a plurality of features based on the radar data; providing the plurality of features to
(Continued)

a single detection head; and determining a plurality of properties of an object based on an output of the single detection head.

19 Claims, 22 Drawing Sheets

(51) Int. Cl.
  *G01S 7/41* (2006.01)
  *G01S 13/86* (2006.01)
  *G06F 18/25* (2023.01)
  *G06N 3/04* (2023.01)
  *G06V 20/58* (2022.01)

(52) U.S. Cl.
  CPC .......... *G01S 13/865* (2013.01); *G01S 13/867* (2013.01); *G06F 18/253* (2023.01); *G06N 3/04* (2013.01); *G06V 20/58* (2022.01); *B60W 2420/403* (2013.01); *B60W 2420/408* (2024.01); *B60W 2554/404* (2020.02)

(58) Field of Classification Search
  CPC . G01S 7/417; B60W 60/001; B60W 2420/42; B60W 2420/52; B60W 2554/404; G06F 18/253; G06N 3/04; G06V 20/58
  See application file for complete search history.

(56) References Cited

U.S. PATENT DOCUMENTS

| | | | |
|---|---|---|---|
| 2016/0223651 A1 | 8/2016 | Kamo et al. | |
| 2018/0082137 A1 | 3/2018 | Melvin et al. | |
| 2018/0341017 A1 | 11/2018 | Kamo et al. | |
| 2020/0160532 A1* | 5/2020 | Urtasun | G06V 20/582 |
| 2020/0160559 A1 | 5/2020 | Urtasun et al. | |
| 2020/0200871 A1 | 6/2020 | Patel et al. | |
| 2020/0225321 A1 | 7/2020 | Kruglick et al. | |
| 2020/0294401 A1* | 9/2020 | Kerecsen | G08G 1/205 |
| 2020/0355817 A1 | 11/2020 | Gillian et al. | |
| 2021/0096241 A1* | 4/2021 | Bongio Karrman | G01S 13/42 |
| 2021/0208272 A1* | 7/2021 | Lavian | H03L 7/091 |
| 2021/0295113 A1* | 9/2021 | Sless | G06F 18/25 |

FOREIGN PATENT DOCUMENTS

| | | |
|---|---|---|
| WO | 2020113160 | 6/2020 |
| WO | 2020113166 | 6/2020 |
| WO | 2020146428 | 7/2020 |

OTHER PUBLICATIONS

Jonas, et al., "Single-Snapshot Direction-of-Arrival Estimation of Multiple Targets Using a Multi-Layer Perceptron", Apr. 15, 2019, 4 pages.
Kederer, et al., "Direction of arrival (DOA) determination based on monopulse concepts", Feb. 2000, 5 pages.
Mandic, et al., "Why a Complex Valued Solution for a Real Domain Problem", Sep. 2007, pp. 384-389.
Monning, et al., "Evaluation of Complex-Valued Neural Networks on Real-Valued Classification Tasks", Nov. 29, 2018, 18 pages.
Scardapane, et al., "Complex-Valued Neural Networks with Nonparametric Activation Functions", Feb. 22, 2018, 12 pages.
Terabayashi, "Ultrawideband Direction-of-Arrival Estimation Using Complex-Valued Spatiotemporal Neural Networks", Sep. 2014, pp. 1727-1732.
"Extended European Search Report", EP Application No. 21159039.3, Jul. 16, 2021, 11 pages.
"Extended European Search Report", EP Application No. 20187674.5, Dec. 4, 2020, 11 pages.
"Frequency-Modulated Continuous-Wave Radar (FMCW Radar)", Retrieved at: https://www.radartutorial.eu/02.basics/Frequency%20Modulated%20Continuous%20Wave%20Radar.en.html—on Jul. 23, 2021, 6 pages.
Adavanne, et al., "Direction of Arrival Estimation for Multiple Sound Sources Using Convolutional Recurrent Neural Network", Aug. 5, 2018, 6 pages.
Bengtsson, "Models for tracking in automotive safety systems", Licentiate thesis, 2008, Jan. 2008, 189 pages.
Bialer, et al., "Performance Advantages of Deep Neural Networks for Angle of Arrival Estimation", Feb. 17, 2019, 5 pages.
Brooks, et al., "Complex-valued neural networks for fully-temporal micro-Doppler classification", Jun. 2019, 10 pages.
Kellner, "Instantaneous Full-Motion Estimation of Arbitrary Objects using Dual Doppler Radar", Jun. 2014, 6 pages.
Kellner, et al., "Tracking of Extended Objects with High Resolution Doppler Radar", Dec. 2015, 13 pages.
Krim, "Two Decades of Array Signal Processing Research: The Parametric Approach", Jul. 1996, pp. 67-94, 28 pages.
Liu, et al., "Direction-of-Arrival Estimation Based on Deep Neural Networks With Robustness to Array Imperfections", Oct. 2018, 13 pages.
Schlichenmaier, et al., "Clustering of Closely Adjacent Extended Objects in Radar Images using Velocity Profile Analysis", Apr. 2019, 5 pages.
Schlichenmaier, et al., "Instantaneous Actual Motion Estimation with a Single High-Resolution Radar Sensor", Apr. 2018, 5 pages.
Swindlehurst, et al., "Application Of Music To Arrays With Multiple Invariances", Jun. 2000, pp. 3057-3060, 4 pages.
First Office Action regarding Chinese Patent Application No. 202110843128.4, dated Feb. 5, 2025. Translatoin provided by Google Translate.

* cited by examiner

METHODS AND SYSTEMS FOR DETECTION OF OBJECTS IN A VICINITY OF A VEHICLE

CROSS-REFERENCE TO RELATED APPLICATIONS

This application claims priority to European Patent Application Number 21159039.3, filed Feb. 24, 2021, and European Patent Application Number 20187674.5, filed Jul. 24, 2020, the disclosures of which are hereby incorporated by reference in their entireties herein.

BACKGROUND

The present disclosure relates to methods and systems for detection of objects in a vicinity of a vehicle.

Object detection is an essential pre-requisite for various tasks, in particular in autonomously driving vehicles.

Accordingly, there is a need to provide efficient and reliable object detection.

SUMMARY

The present disclosure provides a computer implemented method, a computer system, and a non-transitory computer readable medium according to the independent claims. Embodiments are given in the subclaims, the description and the drawings.

In an aspect, the present disclosure is directed at a computer implemented method for detection of objects in a vicinity of a vehicle, the method comprising the following steps carried out by computer hardware components: acquiring radar data from a radar sensor; determining a plurality of features based on the radar data; providing the plurality of features to a single detection head; and determining a plurality of properties of an object based on an output of the single detection head.

With such a structure, the features are provided to exactly one layer (i.e. to one layer only, and not to more than one layer), and the output of this layer is provided to exactly one subsequent layer, and so on, and the output of the last layer provides the properties to be determined.

According to another aspect, each of the features (in other words: data lines corresponding to the features) is connected to the output of the single detection head. It has been found that with such a structure, the features may have effect on each of the properties, so that all properties may be determined using the single detection head.

According to another aspect, the single detection head comprises a plurality of sequentially arranged layers. The features may be provided to a first layer, and the output of the first layer may be provided to a second layer, and so on. The output of the last layer may provide the determined properties. One or more (or all) of the layers may be convolutional layers.

According to another aspect, the single detection head is free from layers arranged in parallel. Layers in parallel may lead to separate detection paths, wherein an output of one layer may not possibly have a connection to a subsequent layer in the parallel structure. In contrast thereto, according to various embodiments, the single detection head is free from such parallel layers, so that every output of one layer may possibly effect the subsequent layer (even though a weight of zero (0) may be trained, so that an output actually does not have any effect).

According to another aspect, the features are determined using an artificial neural network. It will be understood that the artificial neural network for determining the features may be provided separate from the single detection head (so that the single detection head provides a separated artificial neural network) or combined with the single detection head (so that the artificial neural network for determining the features and the single detection head provide a single, combined artificial neural network).

According to another aspect, the single detection head is trained for all of the properties simultaneously. Furthermore, the single detection head may be trained simultaneously with the artificial neural network which determines the features.

According to another aspect, the plurality of properties comprises at least two of a class of the object, a size of the object, or a yaw angle of the object. It will be understood that any other properties as desired may be determined; the detection head and the features may then be trained towards detecting these features using suitable training data (for example data which shows radar detections and labelled detections, wherein the labelled detections may be provided manually or by supervised learning).

According to another aspect, the computer implemented method further comprises the following steps carried out by computer hardware components: determining a radar data cube based on the radar data; providing the radar data cube to a plurality of layers of a neural network; resampling the output of the plurality of layers into a vehicle coordinate system; and determining the plurality of features based on the resampled output. It has found that applying the unified detection head to the radar net provides enhanced detection results and decreased computational complexity.

According to another aspect, the computer implemented method further comprises the following step carried out by the computer hardware components: fusing data from a plurality of radar sensors; wherein the plurality of features are determined based on the fused data. It has been found that also using the data from further radar sensors (i.e. the data of the plurality of radar sensors) for determining the features may enhance the detection results.

According to another aspect, the computer implemented method further comprises the following step carried out by the computer hardware components: acquiring camera data from a camera; wherein the plurality of features wherein are determined further based on the camera data. It has been found that also using the camera data for determining the features may enhance the detection results.

According to another aspect, the computer implemented method further comprises the following step carried out by the computer hardware components: acquiring lidar data from a lidar sensor; wherein the plurality of features are determined further based on the lidar data. It has been found that using also the lidar data for determining the features may enhance the detection results.

According to another aspect, the computer implemented method further comprises the following step carried out by the computer hardware components: determining an angle of arrival based on the radar data.

In another aspect, the present disclosure is directed at a computer implemented method for detection of objects in a vicinity of a vehicle, the method comprising the following steps performed (in other words: carried out) by computer hardware components: acquiring radar data from a radar sensor; determining a radar data cube based on the radar data; providing the radar data cube to a plurality of layers (for example convolution(al) layers or inner products) of a neural network; resampling the output of the plurality of layers into a vehicle coordinate system; and detecting an object based on the resampled output.

In other words, radar data may be acquired and may be processed in various domains, and the data in the various domains may be used for object detection.

According to another aspect, the computer implemented method further comprises the following steps carried out by the computer hardware components: fusing data from a plurality of radar sensors; and detecting the object further based on the fused data.

According to another aspect, the computer implemented method further comprises the following step carried out by the computer hardware components: acquiring camera data from a camera; wherein the object is detected further based on the camera data.

According to another aspect, the computer implemented method further comprises the following step carried out by the computer hardware components: acquiring lidar data from a lidar sensor; wherein the object is detected further based on the lidar data.

According to another aspect, the computer implemented method further comprises the following step carried out by the computer hardware components: determining an angle of arrival based on the radar data cube.

According to another aspect, wherein the angle of arrival is detected (in other words: determined) using an artificial network with a plurality of layers, for example a plurality of fully connected layers.

Using the artificial network allows an independence of the result from a calibration to the specific sensor arrangement and possible sensor misalignment.

According to another aspect, wherein the artificial neural network further comprises a dropout layer. The dropout layer may increase robustness of the processing.

According to another aspect, the object is detected further based on a regression subnet. The regression network may combine data from the camera, lidar sensor, and the various radar domains.

According to another aspect, the regression subnet comprises at least one of a u-shaped network and a LSTM.

According to another aspect, the regression subnet comprises an ego-motion compensation module. The egomotion compensation may provide that the data that is combined in the regression subnet is provided in the same coordinate system, even if data from various time steps is combined.

According to another aspect, the ego-motion compensation module carries out ego-motion compensation of an output of a recurrent network of a previous time step, and inputs the result of the ego-motion compensation into a recurrent network of present time step.

According to another aspect, the ego-motion compensation module carries out an interpolation, wherein the interpolation comprises a nearest neighbor interpolation and further comprises recording a residual part of a movement. This may avoid a drift (due to an accumulation of location errors) in the location over time.

In another aspect, the present disclosure is directed at a computer system, said computer system comprising a plurality of computer hardware components configured to carry out several or all steps of the computer implemented method described herein. The computer system can be part of a vehicle.

The computer system may comprise a plurality of computer hardware components (for example a processor, for example processing unit or processing network, at least one memory, for example memory unit or memory network, and at least one non-transitory data storage). It will be understood that further computer hardware components may be provided and used for carrying out steps of the computer implemented method in the computer system. The non-transitory data storage and/or the memory unit may comprise a computer program for instructing the computer to perform several or all steps or aspects of the computer implemented method described herein, for example using the processing unit and the at least one memory unit.

In another aspect, the present disclosure is directed at a vehicle comprising the computer system and the radar sensor.

In another aspect, the present disclosure is directed at a non-transitory computer readable medium comprising instructions for carrying out several or all steps or aspects of the computer implemented method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM), such as a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all steps or aspects of the computer implemented method described herein.

BRIEF DESCRIPTION OF THE DRAWINGS

Exemplary embodiments and functions of the present disclosure are described herein in conjunction with the following drawings, showing schematically.

DETAILED DESCRIPTION

Radar signal processing in its core has many similarities to image processing. An FFT (fast Fourier transform) may be used to generate a range Doppler map, in which after sidelobe suppression peaks above the local noise level are identified using a variable threshold. These beam-vectors may be subsequently filtered and finally super resolution angle finding methods may be applied.

Figure 10:
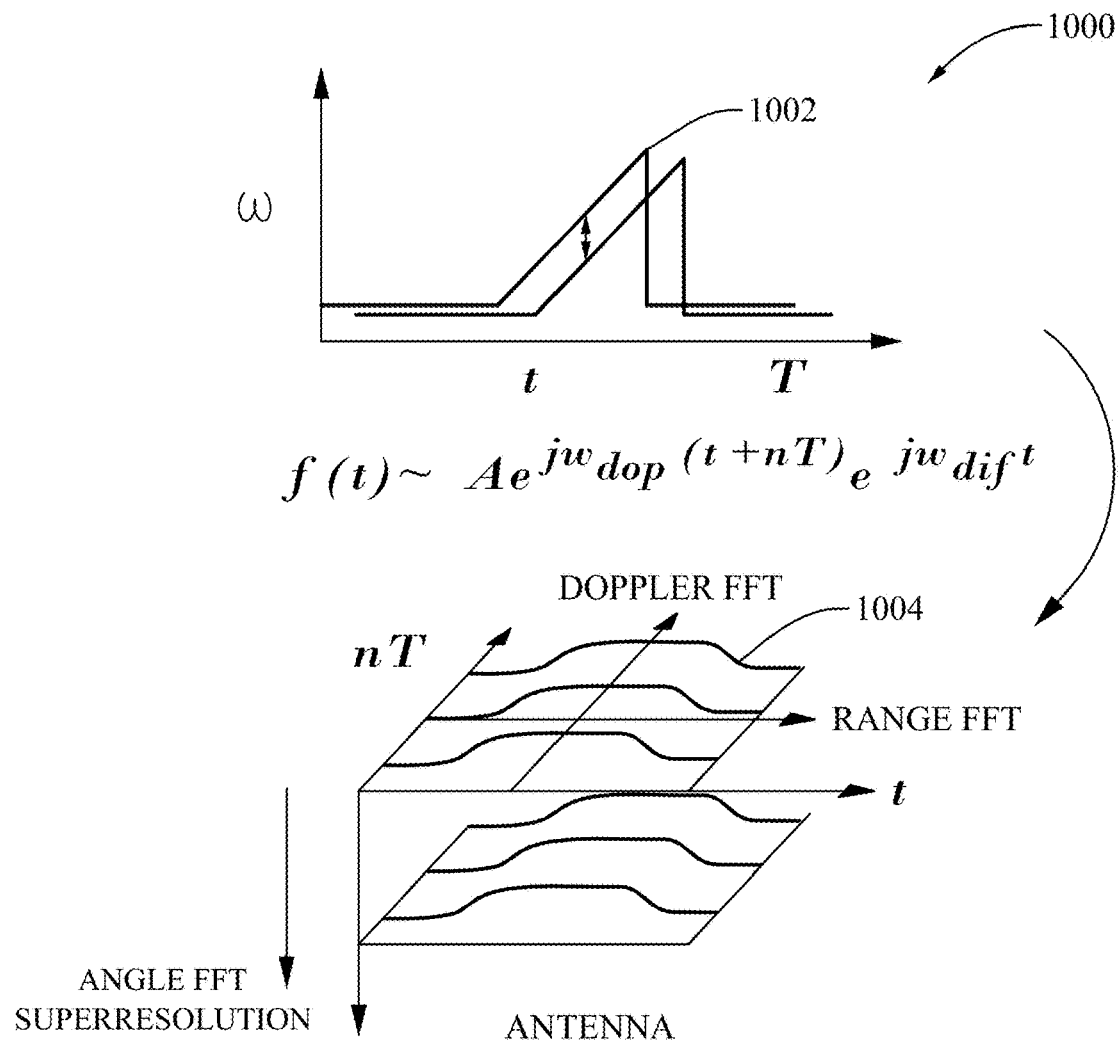
FIG. 10 an illustration of processing carried out for the radar data according to various embodiments.

FIG. 10 shows an illustration 1000 of processing carried out for the radar data, for example for a FMCW radar (frequency modulated continuous wave radar). FMCW radar is an active sensor which measures the distance from time differences between outgoing and incoming wave. An FMCW radar generates a continuous wave with alternating frequencies (in other words: a frequency ramp 1002, which may be referred to as a chirp). Downmixing the transmitted and received signal yields the IF (intermediate frequency) signal. The frequencies of the fast time (duration of 1 chirp) IF signal are proportional to the target range (in other words: the distance). The phase variation along multiple chirps measured over a long time (slow time) is proportional to the relative radial Doppler shift induced by the reflectors radial movement. Thus, the received signal may be transformed into a Doppler-range diagram 1004, with one plane per antenna.

Figure 11:
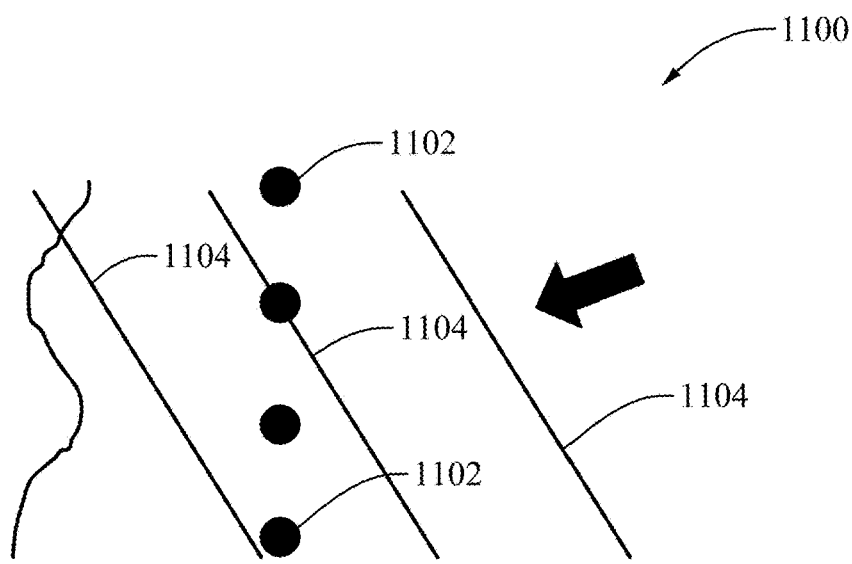
FIG. 11 an illustration of a multiple antenna FMCW radar arrangement according to various embodiments.

FIG. 11 shows an illustration 1100 of a multiple antenna FMCW radar arrangement. A plurality of antennas 1102 is illustrated. Reflected waves 1104 hit the different antennas 1102 with different phases. The phase shift induces a frequency over the antenna array which is proportional to the cos of the direction of arrival (DOA).

A 2D FFT (fast Fourier transform) may decompose the input signal for each antenna into frequency components and thus range and Doppler. Targets may appear as peaks in an integrated range Doppler map, and peaks above a certain energy level may be processed with FFT/DOA estimation methods and may be used to detect the direction of arrival of targets with a specific range Doppler value. The energy (res) may be extracted, rescaling to scale to output unit systems and looktype compensation, detection point cloud generation, and tracking and object hypothesis generation may be provided, as described in more detail herein.

Figure 12:
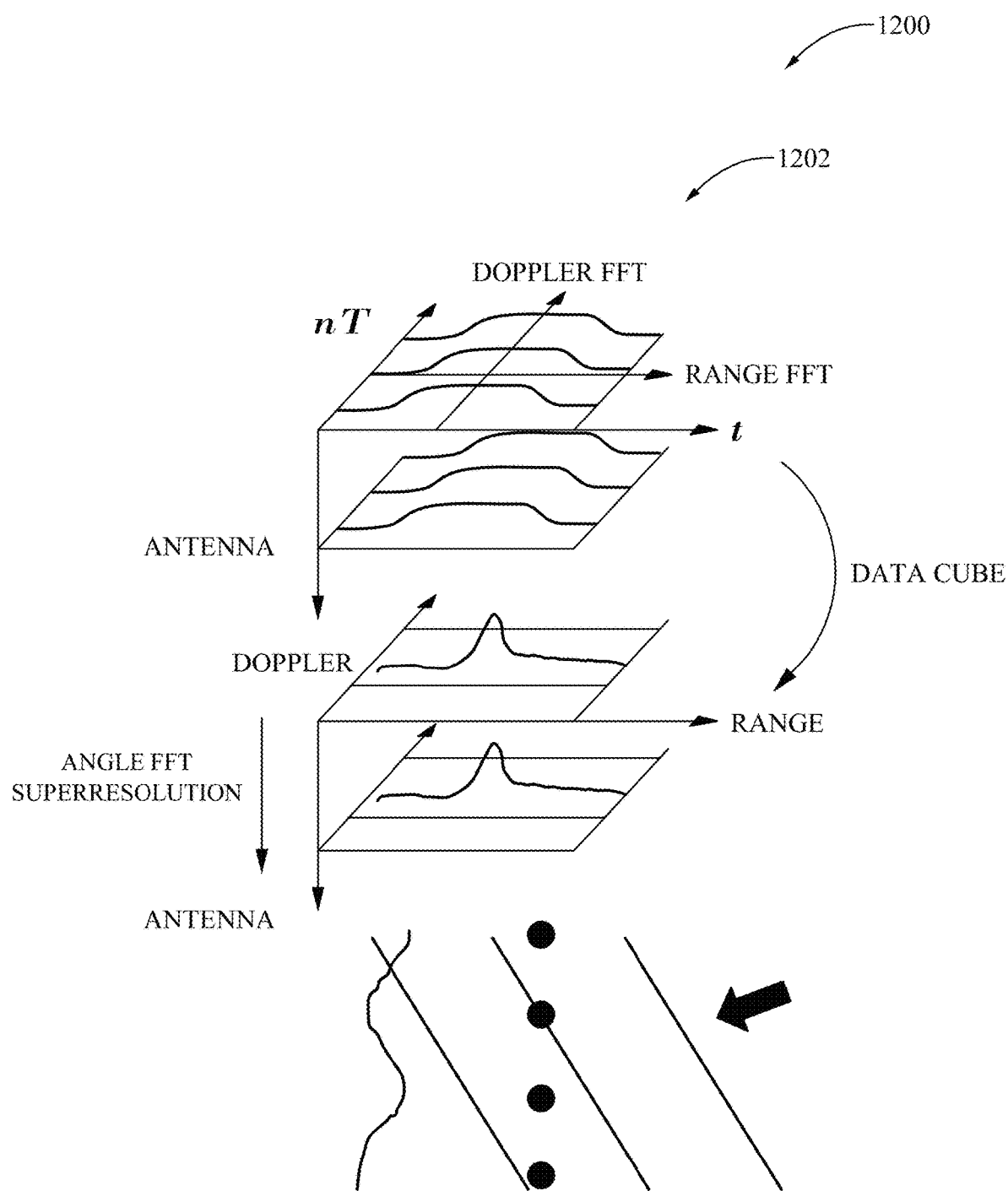
FIG. 12 an illustration of how data cubes are determined according to various embodiments.

FIG. 12 shows an illustration 1200 of how data cubes are determined.

Looktype compensated Doppler and range values as well as RCS (radar cross-section) values may be generated for the remaining peaks, which form a detection list. The detection list may be transformed to Cartesian coordinates and the measurements may be processed by a tracker which filters mistakes and creates temporally stable tracks from flickering detections as well as bounding boxes. Deep (artificial neural) networks may be used in image processing, language processing and other fields. Deep architectures have proven to deliver superior results to the previous hand crafted algorithm, feature engineering and classification. The question is, how to translate the classical form of processing to deep networks;

how to generate bounding boxes on an environmental map;

find the angle of beamvectors;

give high level box hypothesis generation algorithms access to low level data;

fuse the data of multiple radars; and solve the domain problem (Radar works in an RD space).

Looktypes may be provided to handle the sampling problem: The sampling of a signal needs to obey Nyquist sampling theorem, and violation of the Nyquist sampling theorem will result in ambiguities in the reconstructed signal. The problem may be resolved for the range by low pass filtering to remove frequencies higher than $f_{sampling}/2$. Regarding Doppler, using different resolutions for different scans (Looktypes) yields different ambiguous results, and temporal fusion methods (e.g. tracking) may then be used to resolve the ambiguities by using at least two detections of the same object. In this context, range looktypes refers to different resolutions in range so that it is also possible to get finer resolution (every n-th frame). For example, the data cube may include different resolutions, for example four different resolutions (in other words: four looktypes).

According to various embodiments, a network, which may be referred to as the RaDOR Net (Radar Deep Object Recognition network), may be provided to solve these problems.

Various embodiments may allow for superior performance compared to traditional methods and may provide data driven performance gains.

Figure 1:
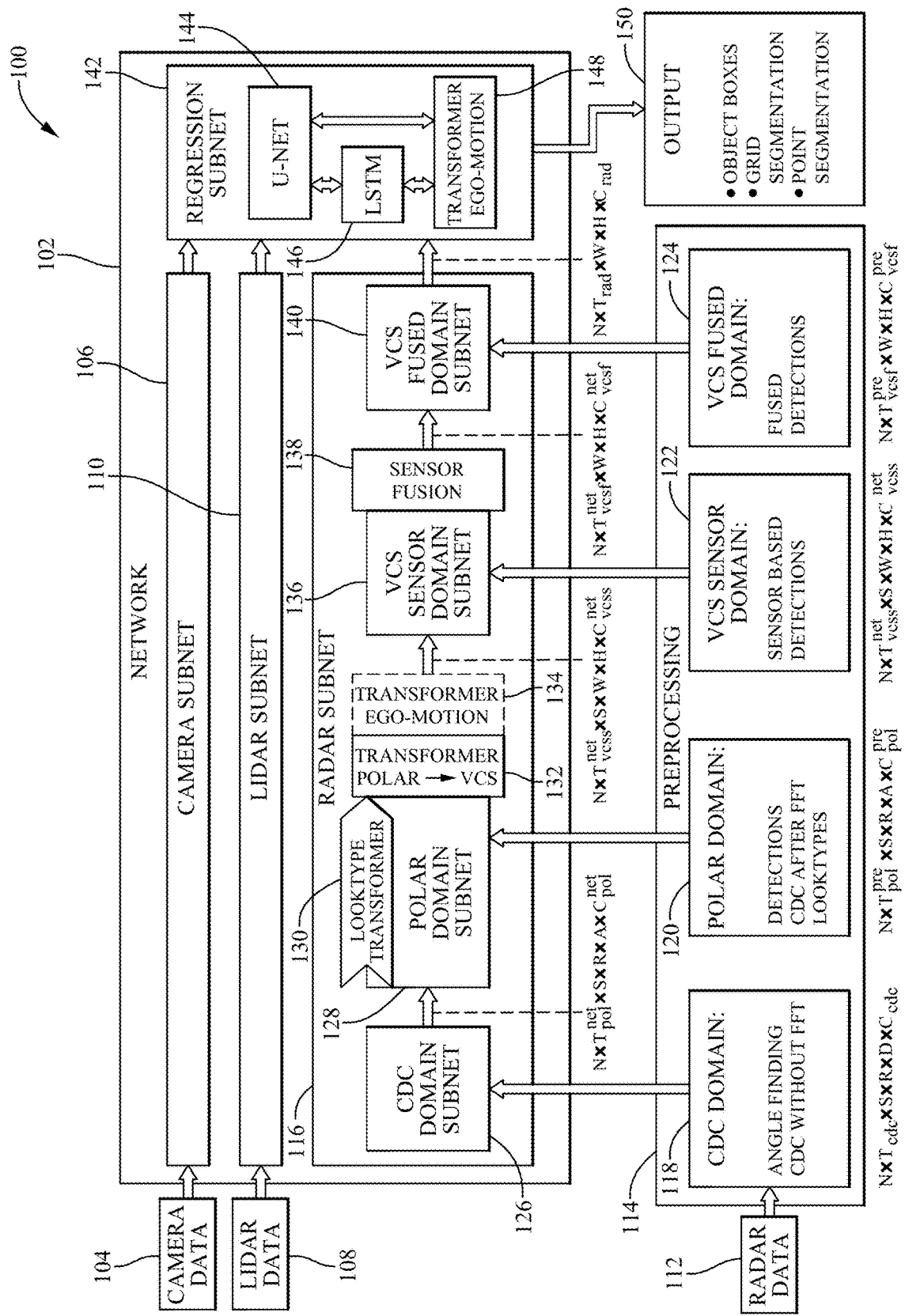
FIG. 1 a structure of the RaDOR Net according to various embodiments.

FIG. 1 shows a structure 100 of the RaDOR Net according to various embodiments, which may allow inputs from different domains (for example a CDC domain 118, a POLAR domain 120, a VCS (vehicle coordinate system) sensor domain 122, and a VCS fused domain 124) to be used, for example in a preprocessing module 114 for pre-processing radar data 112 to a network 102. The network 102 may include a camera subnetwork 106, which may receive camera data 104, a lidar subnetwork 110, which may receive lidar data 108, and a radar subnetwork 116 which may receive data from the various domains.

In a full end2end pipeline, only input from the CDC domain 118 may be used.

As an input, a 3D Compressed Data Cube (CDC) 112 may be used. This cube may be sparse as all beamvectors below CFAR (constant false alarm rate) level may be suppressed. Missing antenna elements in the beamvector may be interpolated. Calibration may be applied and the bin-values may be scaled according to the radar equation. According to various embodiments, uncompressed data cubes may be used, and a ML (machine learning) based bin suppression method may be utilized.

Data from the CDC domain 118 may be used in a CDC domain subnet 126. In the CDC domain subnet 126, on each beamvector of the range Doppler map, an angle finding network is applied. This network may be an MLP (multi-layer perceptron) which may share the same parameters across all beam-vectors or more complex like described in more detail below. The CDC domain subnetwork 126 may create a range, angle, Doppler cube which may be subsequently processed with convolution layers to filter the input.

Data from the polar domain 120 may be provided to the polar domain subnet 128. In the polar domain subnet 120, the Doppler bins may be ego-motion compensated depending on the angle bins (different projections of the ego-speed).

The Doppler component may be compressed into multiple feature maps using an encoder subnetwork. A resampling layer may map different looktypes to a common representation and a coordinate conversion resampling layer may convert the feature planes from polar coordinates to a Cartesian feature plane output. In order to alleviate problems with interpolation artifacts, both conversations may be combined into one step.

The idea behind this transformation is to process further information in a feature space where object shape is invariant to translation (e.g. the same convolutions can be applied at different spatial locations in this space).

A looktype transformer 130, a polar to vehicle coordinate system transformer 132 and an ego motion transformer 134 may be provided.

Data from the VCS sensor domain 122 may be provided to the VCS sensor domain subnet 136. In the VCS sensor domain subnet 136, a max pooling may be applied to fuse the results of different radars, in order to generate feature planes combining the observation feature planes from all radars. In further embodiments, other fusion methods like gated fusion may be applied. A sensor fusion module 138 may be provided.

Data from the VCS fused domain 124 may be provided to the VCS fused domain subnet 140.

The various domain subnets 126, 128, 136, 140 may be referred to as radar subnet 116.

In a regression subnetwork 142, data from the camera subnetwork 106, the lidar subnetwork 110, and the radar subnetwork 116 may be received.

The regression subnetwork 142 may include a U-shaped network 144, a LSTM (long short-term memory) 146, and an ego-motion transformer 148, and may provide an output 150.

The U-shaped network 144 may be used to detect objects. Ego motion compensated recurrent networks like LSTMs 146 may be used to combine multiple timesteps into one result.

The egomotion transformation will be described in more detail below. The transformation may not be estimated within the network but may be generated outside of the network.

RaDor Net according to various embodiments may connect data cube input from on radar or from multiple radars and object output in an end to end fashion.

According to various embodiments, a multi-domain direction of arrival estimation neural network may be provided.

A very important step in localization of objects in the environment using a radar system may be to accurately estimate the incidence angle of the received electromagnetic signal reflected from objects of interest. Together with the use of range information, this angle may be used to calculate the position of objects. Due to various limitations, such as noise in the received signal and multiple unwanted reflections along with constraints in the hardware, the estimation of angular information may be a very challenging task.

The method for estimation of direction of arrival may use a neural network architecture as an angle estimation method. It may be noted note that all classical signal processing methods to some degree rely on a pre-defined model to estimate parameters whereas the neural network according to various embodiments may be fully data dependent. This model may also include availability of uniformly sampled data in the spatial domain (e.g. DFT (discrete Fourier transform) based methods) which may require a Uniform Linear Array (ULA) or alternatively, interpolation algorithms to fill in in the missing array positions shall the uniformity not be met. In other cases, a non-uniform sensor array layout can be used but exact positions of the elements in the array may be desired and often calibration processes have to be carried out to correct for the non-idealities of this requirement, including degradation over time. The method according to various embodiments deals with this particular issue in the sense that it may be applied to any array geometry and would even be applicable to uncalibrated arrays.

Commonly used methods mainly suffer from the fact that they are heavily bounded by the resolution of the available hardware to estimate angular information when using DFT based methods that allow real-time processing of data. In order to overcome this limitation, oftentimes high-resolution methods are employed which are computationally expensive and require some assumptions such as a known model order or noise model in data, which are usually unavailable or unreliable when estimated. To this end, the performance of these techniques is usually compromised. For instance in Maximum Likelihood estimators, the number of sources which impinge on the array has to either be known or somehow be estimated (e.g. source enumeration algorithms). Furthermore, depending on the method used, the output of these algorithms is a spectrum/pseudo-spectrum that corresponds to power. In contrast, the method according to various embodiments is fully flexible in this sense and may be trained to produce various outputs such as probability of occupancy in each respective angular sector.

The network according to various embodiments may consist of only few fully connected (in other words: dense) layers. Like any supervised neural network, an integral part of the network performance may be the training data to be used. According to various embodiments, training data may be used to obtain a ground truth angle for each array snapshot of data which is fully independent of the snapshot itself and uses Doppler information to accurately estimate an angle. The network is then trained using this ground truth which is more accurate than the resolution limit resulting from the array hardware would allow and therefore this method leads to a better resolution than using DFT processing even if imperfections were known. This also means that imperfections can be learnt by the network from the information within snapshots without the generation of errors to get the ground truth.

According to various embodiments, use may be made of the input snapshot without any pre-processing and therefore may result in a very low dimensionality of input data. According to various embodiments, a method is provided whereby use of initialization kernels in the early stages of the network, the data may be transformed into a power/energy domain as well as the possibility to output probabilities.

In terms of generating ground truth data for training the resultant network, Doppler information from stationary objects in the environment may be used as a walk around to the resolution limit problem associated with FFT based methods. However, by making use of a transfer learning approach in training the network, the trained weights for the network are used to estimate angles very effectively for all types of targets including non-stationary targets. This is significant because angles of non-stationary targets may not be estimated using Doppler values and therefore a training for these targets would have to use a limited resolution directly from the data snapshot.

The network architecture according to various embodiments may be used to produce outputs in different domains. Two slightly different networks may be used to be either trained to output a probability of occupancy in each respective angular sector or an energy/power spectrum.

Figure 2:
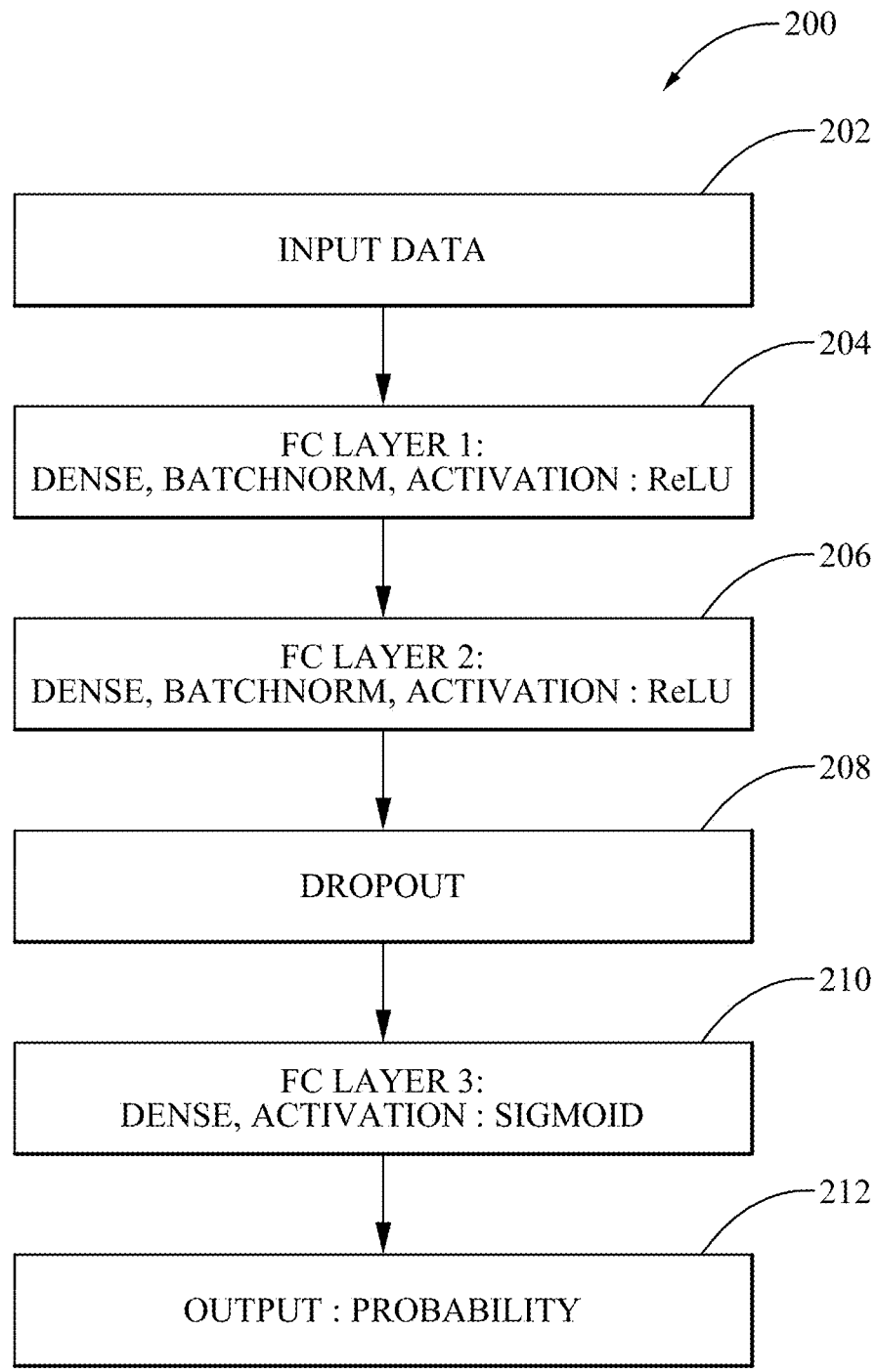
FIG. 2 an illustration of a first embodiment of a multi-domain direction of arrival estimation neural network according to various embodiments.

FIG. 2 shows an illustration 200 of a first embodiment of a multi-domain direction of arrival estimation neural network according to various embodiments. A multilayer perceptron (MLP) consisting of several dense layers 204, 206, 210 may be used in combination with batch normalization and a rectified linear unit (ReLU) as an activation function for each layer except the last layer 210. The input 202 may either be a beamvector or an autocorrelation matrix calculated with that beamvector. Before the last dense layer 210 is applied, a dropout layer 208 may be used to make the training more robust. The last layer 210 may use a sigmoid activation to create probabilities for each output neuron. Each output neuron 212 may represent an angular bin and the value indicates the probability that this angular region is occupied. This architecture has the advantage that it can be used for changing number of targets in different input beamvectors.

It will be understood that even though three FC (fully connected) layers 204, 206, 210 are shown in FIG. 2, any other number of fully connected layers may be provided.

Figure 3:
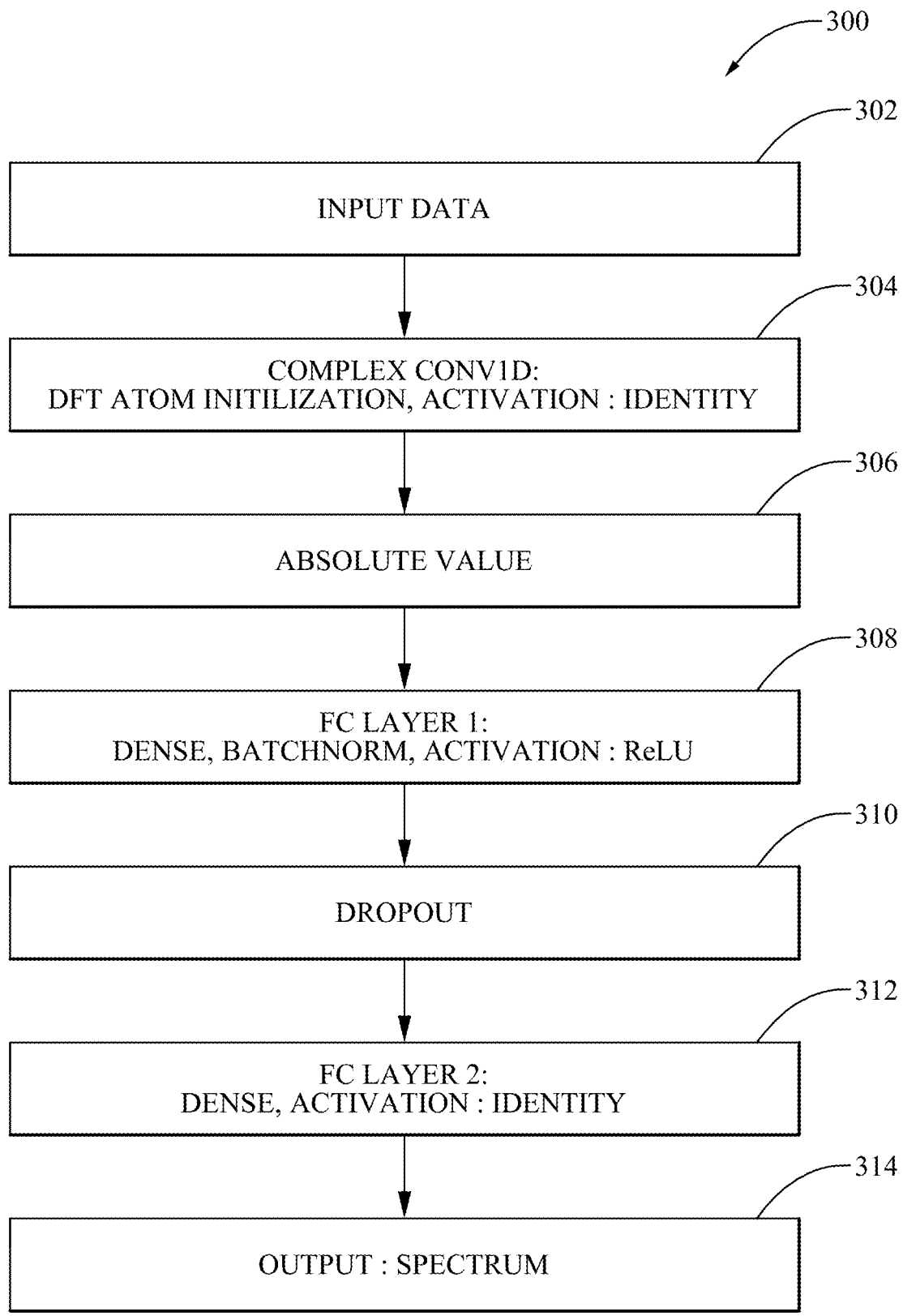
FIG. 3 an illustration of a second embodiment of a multi-domain direction of arrival estimation neural network according to various embodiments.

FIG. 3 shows an illustration 300 of a second embodiment of a multi-domain direction of arrival estimation neural network according to various embodiments.

In the second embodiment, it may be desired not only to know the angles of the targets detected by the radar, but also to retrieve the information about the amount of energy each target reflects. That means that the output of the network represents no longer a probability for each angular bin being occupied. Instead, each neuron represents the amount of energy arriving from the corresponding angular region. Therefore, in the network of the second embodiment, the sigmoid activation is removed (i.e. is not present) in the last layer 312 which provides the output 314. As the Euclidean norm of such a spectrum is the same as the Euclidean norm of the input beamvector, it may be desired to enforce the network to preserve the energy of the input. For that purpose, an additional activation regularization term may be introduced to the loss function which consists of the absolute difference between the norm of the input and the output. This term is weighted with an adjustable hyperparameter and may either be applied on the input and output of the whole network or on the input and output of each layer. In the latter case, the errors of the different layers are summed up. Another change in the network design is the usage of a one-dimensional convolutional layer as the very first layer 304, which receives the input data 302. This layer may represent a learnable version of a Discrete Fourier Transformation (DFT). This means that this layer may be constructed to have complex weights which may be initialized with the atoms of the DFT. Additionally, this layer may be used without activation and bias. After that convolutional layer 304, the absolute value 306 of that complex output tensor may be calculated as this value represents the magnitude in a classical DFT. The rest of the network is operating on real numbers like in the first embodiment, so that after the absolute value 306 is determined, a fully connected layer 308 and a dropout layer 310 are provided.

The networks according to various embodiments have been implemented and tested on different datasets for SRR4. This may include not only clean training data from the anechoic chamber calibration measurements but also training data on real scenarios generated from Doppler of a stationary scenario from a moving host which helps to generalize also on other unknown influences to the angle finding like the bumper of the car. Due to the transfer learning approach, the testing may be also done on the stationary objects as well as on moving objects. Therefore, an angle finding dataset of moving objects has been created which picks the beamvector from the moving targets by speed filtering and calculates the angle groundtruth (gt) using super resolution techniques for the angle finding like a Maximum Likelihood estimate. For a quantitative analysis precision, recall and the root mean square error (RMSE) has been analyzed (as listed in Table 1) and for a qualitative analysis the influence on subsequent modules like occupancy grid mapping has been tested.

TABLE 1

|  | RMSE | Precision | Recall |
| --- | --- | --- | --- |
| 2 Layer Network | 1.3804 bins | 0.9964 | 0.9927 |
| 3 Layer Network | 1.3033 bins | 0.9982 | 0 9976 |

Figure 4:
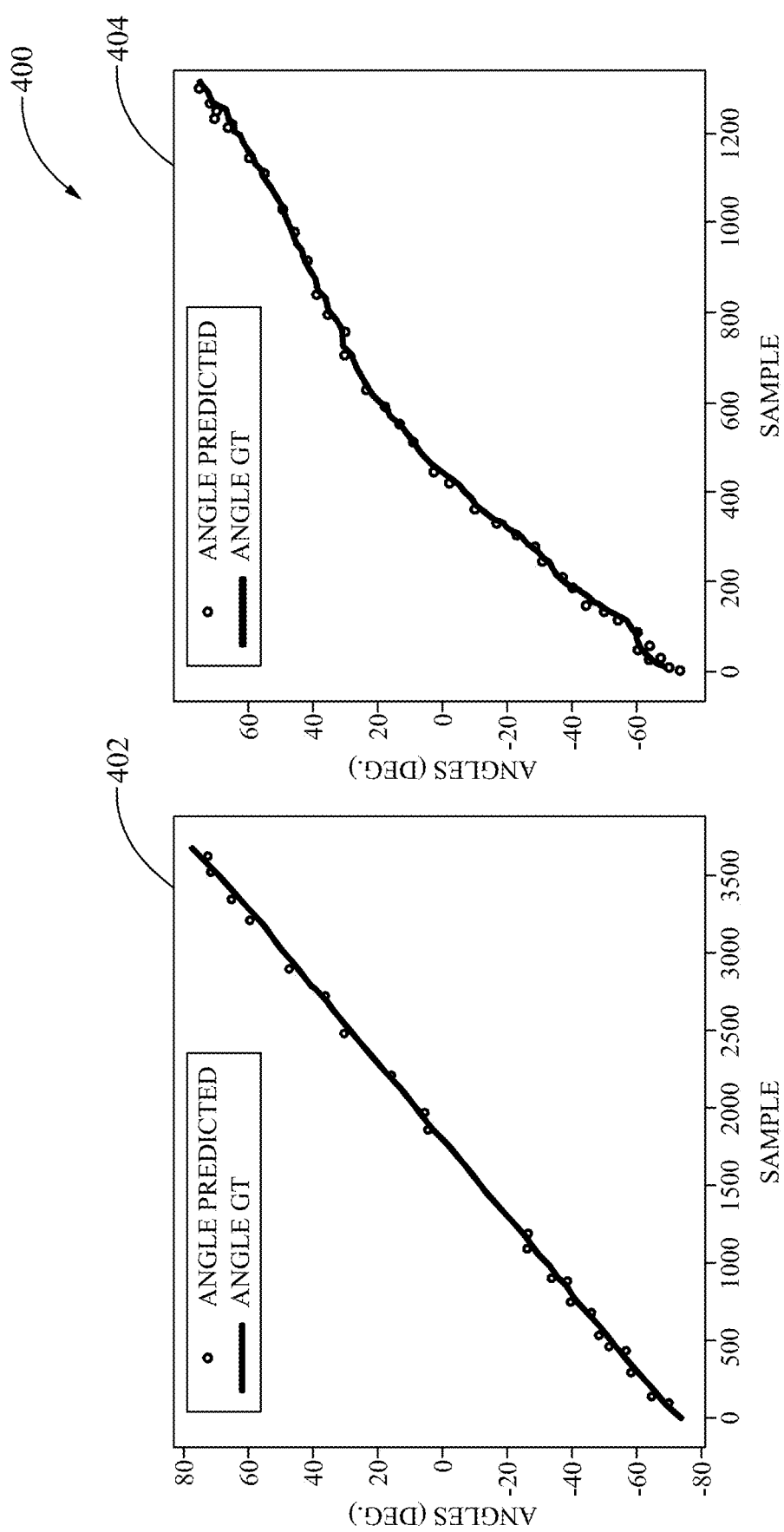
FIG. 4 an illustration of results on stationary dataset and moving objects dataset.

For both of the datasets good performance results have been reached after 60 epochs of training even on the real scenarios which are also depicted in FIG. 4.

Figure 5:
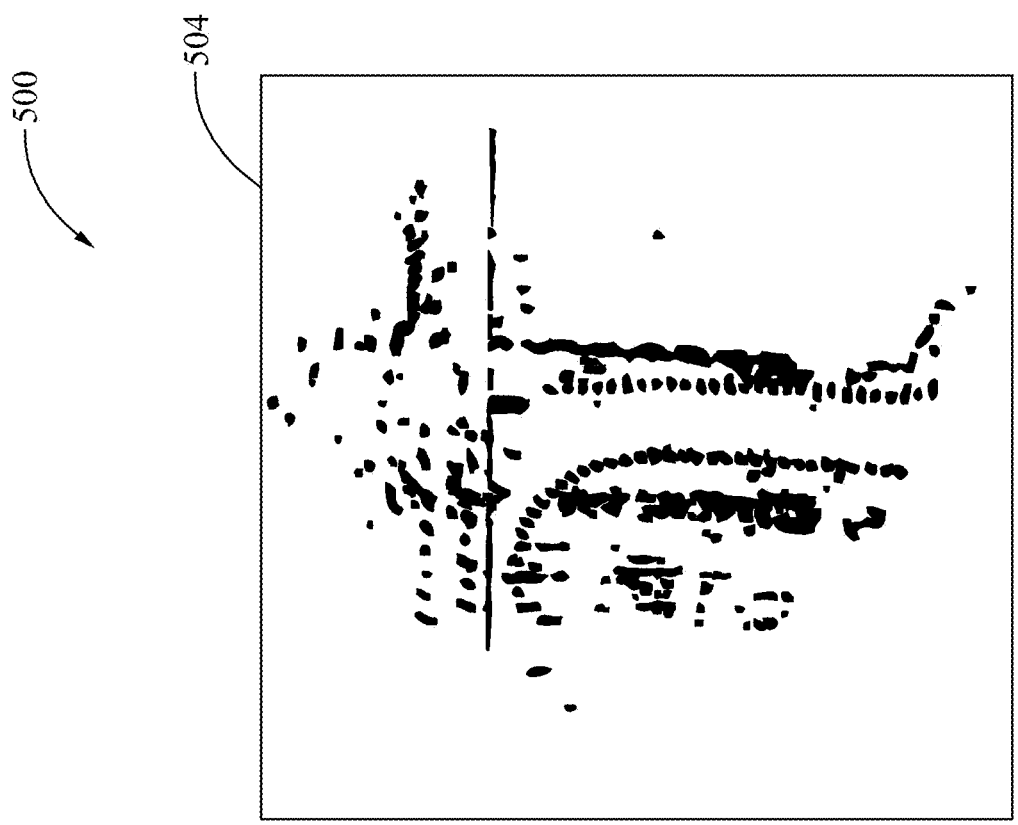
FIG. 5 an illustration of occupancy grid mapping after classical pre-processing angle finding and after angle finding by machine learning according to various embodiments.
Figure 5:
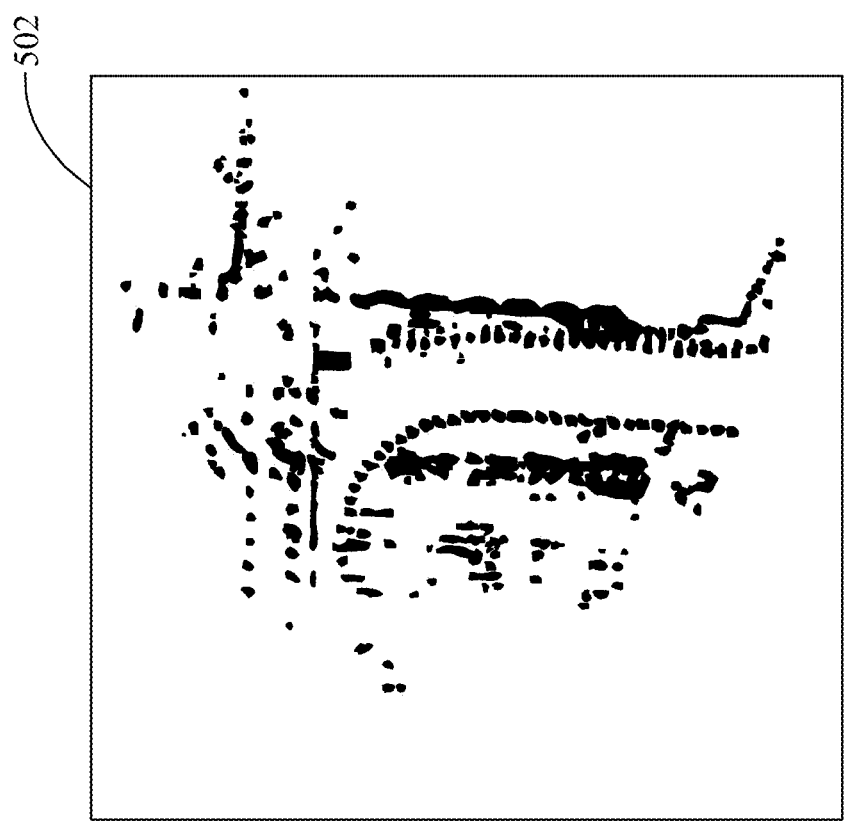

For testing on subsequent modules like occupancy grid mapping, the angle prediction of the network has been induced into the SRR4 resimulation method and visualized in FIG. 4 and FIG. 5. The anglefinding network according to various embodiments is capable to produce similar results on the pre-processed data.

FIG. 4 shows an illustration 400 of results on stationary dataset (left; 402) and moving objects dataset (right; 404). The predicted angle (i.e. the result of the network according to various embodiments) and the groundtruth (gt) are illustrated, and as can be seen, good agreement is achieved.

FIG. 5 shows an illustration 500 of occupancy grid mapping after classical pre-processing angle finding (left; 502) and after angle finding by machine learning according to various embodiments (right; 504).

Figure 6:
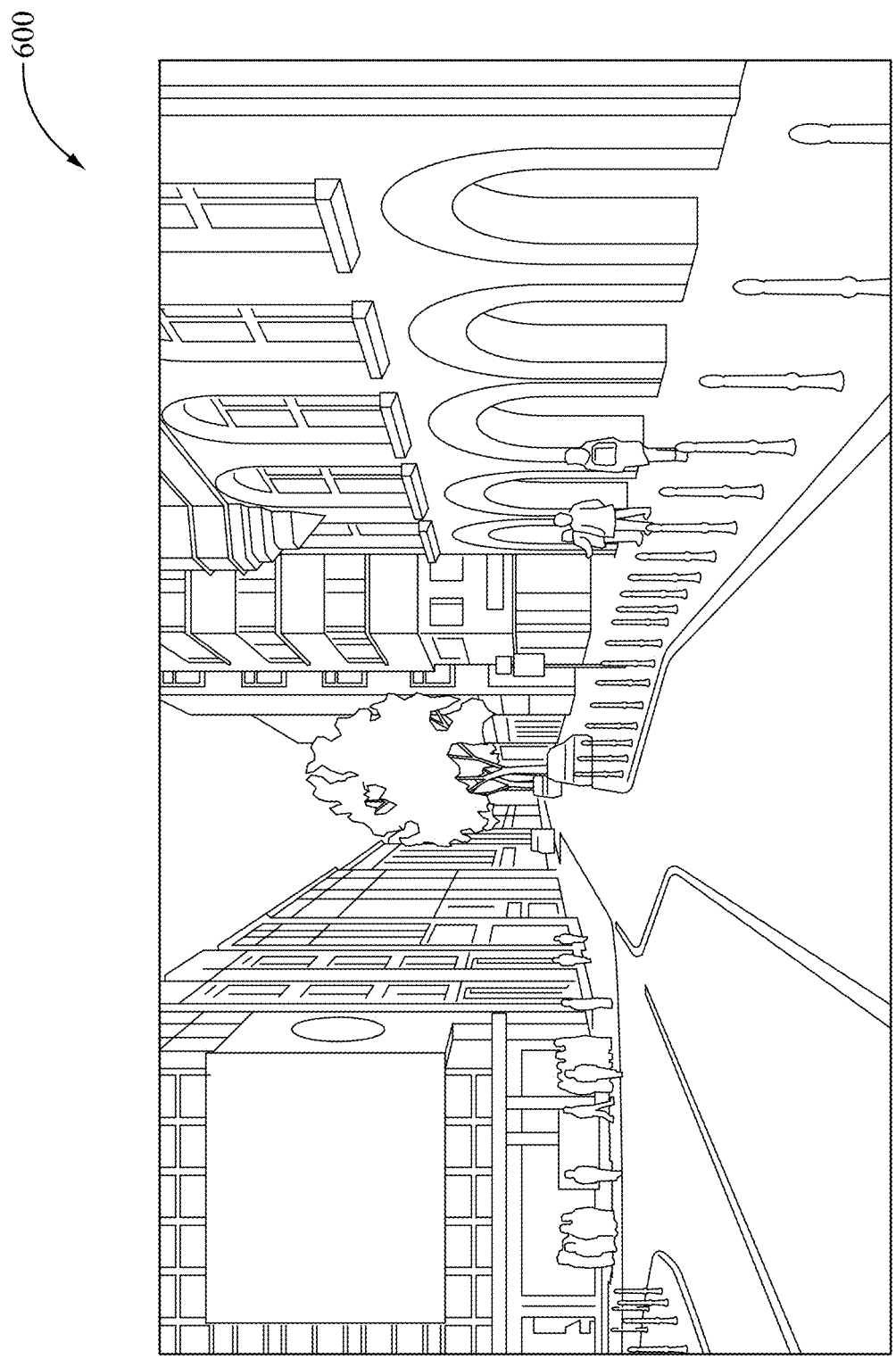
FIG. 6 an illustration of an occupancy grid map scenario.

FIG. 6 shows an illustration 600 of an occupancy grid map scenario from behind which corresponds to the map of FIG. 5.

The multi-domain direction of arrival estimation neural network may provide independency from array data to estimate ground truth, robustness to array mis-calibrations and model imperfections, various possibilities for representation of output domain, a very low complexity network and simplicity in architecture, and an ability to use various representations of data at input level.

Furthermore, multi-domain direction of arrival estimation neural network may be suitable for embedded hardware due to extremely low computation and complexity. Data generation for training of the network may be performed very cost effectively. The network according to various embodiments may be used for arbitrary array geometries which may simplify and relax restrictions for hardware design, and may be trained to output various types of spectra at output which simplifies integration into other networks such as an end-2-end network. The network may be extended to estimate both elevation and azimuth angles.

According to various embodiments, a method for ego motion compensation in recurrent networks may be provided.

An occupancy grid is a well-known tool to accumulate and fuse information over time. Building up occupancy grids requires to on the one hand create an inverse sensor model and on the other hand to combine the information over time, usually by ego motion compensating the past and adding up the past and current sensor data.

According to various embodiments, in a deep network some layers for sensor information preprocessing may be combine with a recurrent neuronal network. The hidden state may be ego motion compensated, allowing the network to locally relate past and current data towards each other and to train the expected output of an occupancy grid, e.g. using lidars. Such an architecture may allow learning the sensor model as well as the best combination method and weighting of data, adapted to the actual situation.

Figure 7:
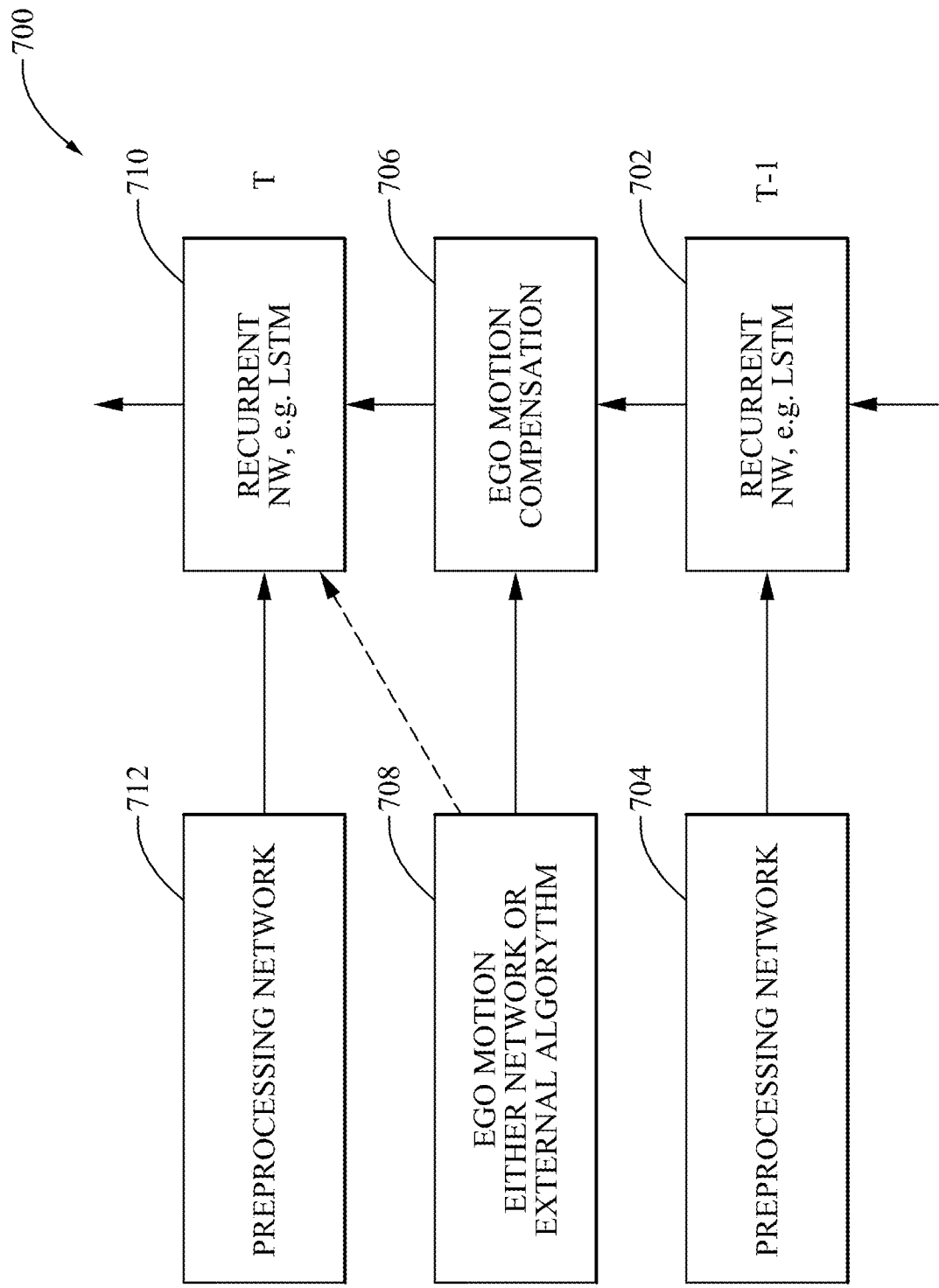
FIG. 7 an illustration of a pipeline of ego motion compensation in a recurrent neural network according to various embodiments.

FIG. 7 shows an illustration 700 of a pipeline of ego motion compensation in a recurrent neural network according to various embodiments.

As illustrated in FIG. 7, for every time step, a preprocessing network 704 (for time step T−1), 712 (for time step T), generates from raw data an intermediate representation (for example formatted by feature channels) and inputs it to the recurrent network (NW), for example LSTM 702 (for time step T−1), 710 (for time step T). The recurrent network 702, 710 may process this input and combine with its hidden state (the memory of previous time steps), and then update the hidden state. The updated hidden state may be passed to next time step for further processing. In this process, a key part may be how to combine the processed input ($I_T$) and the hidden state passed from previous time step ($H_{T-1}$). Normally they are in different coordinate systems since the ego vehicle is moving.

According to various embodiments, $H_{T-1}$ may be transferred (for example by ego compensation module 706) to the coordinate system of time step T, and then may be combined with $I_T$. The combined representation may then be processed by e.g. convolutions to give an updated hidden state $H_T$. The transformation of $H_{T-1}$ may be determined by ego motion 708 at time step T which may come from an external input or a processed data. The transformation may be formatted as a grid which may have the same spatial size as hidden state and may tell how to move every element of hidden state to current coordinate system.

To move an element of hidden state to a new position, an interpolation may be required. Bilinear interpolation may be used, which gives a smoothed output. However, the smoothness may lead to a big loss of useful information. For example, if an element includes the velocity information of a moving object, smoothing this velocity value does not have any sense and this smearing effect may affect the performance of object detection. By using nearest neighbor interpolation, the smearing effect may be avoided but may lead to the movement not being accurate anymore. This positional error may be accumulated with time, which may lead to a wrong movement after some time steps. According to various embodiments, a nearest neighbor interpolation may be adopted, and the residual part of the movement may be recorded. For every time step, both the transformation grid from current frame and the residual part from the previous frame may be combined to give an accurate movement and pass a new residual part to next time step.

Figure 8:
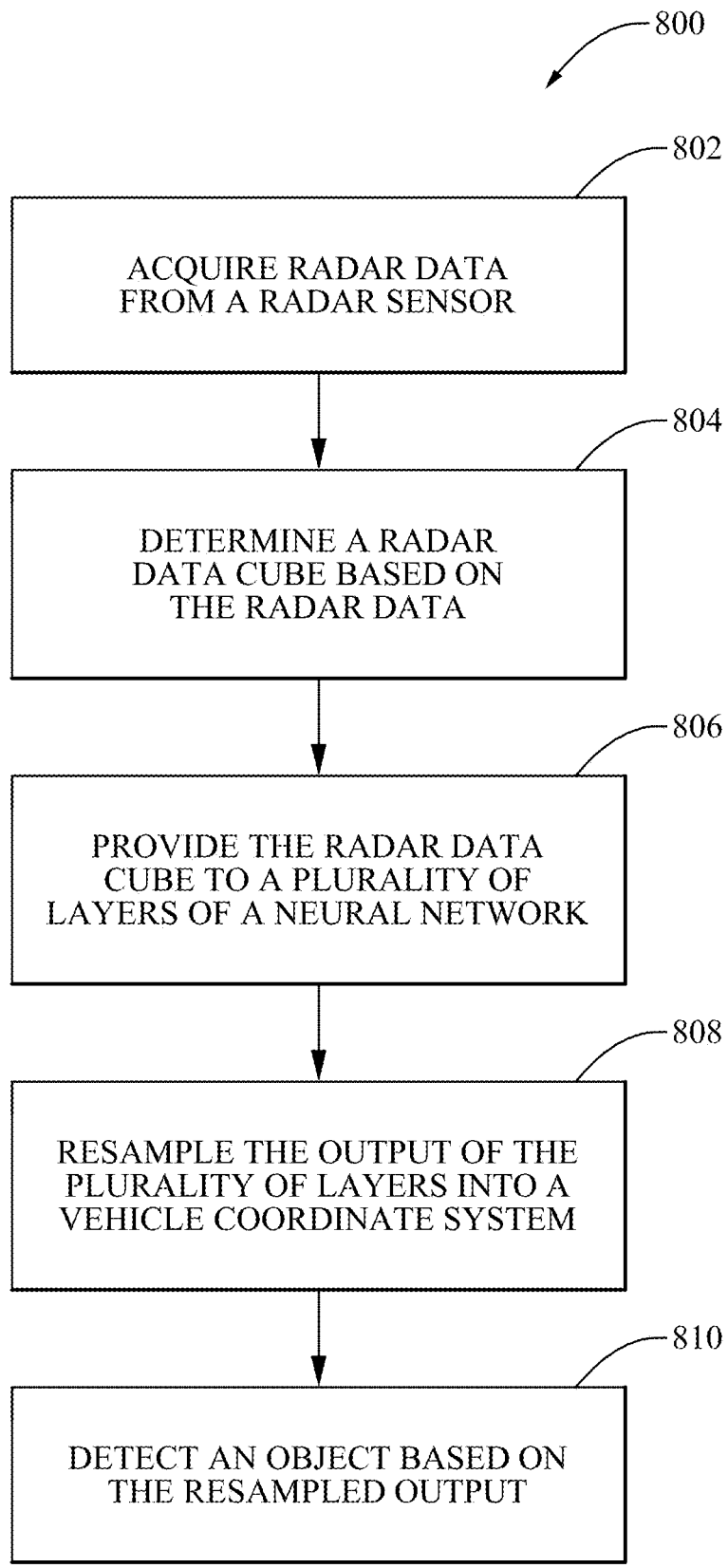
FIG. 8 a flow diagram illustrating a method for detection of objects in a vicinity of a vehicle according to various embodiments.

FIG. 8 shows a flow diagram 800 illustrating a method for detection of objects in a vicinity of a vehicle according to various embodiments. At 802, radar data may be acquired from a radar sensor. At 804, a radar data cube may be determined based on the radar data. At 806, the radar data cube may be provided to a plurality of layers of a (artificial) neural network. At 808, the output of the plurality of layers may be resampled into a vehicle coordinate system. At 810, an object may be detected based on the resampled output.

According to various embodiments, data from a plurality of radar sensors may be fused, and the object may be detected further based on the fused data.

According to various embodiments, camera data may be acquired from a camera, and the object may be detected further based on the camera data.

According to various embodiments, lidar data may be acquired from a lidar sensor, and the object may be detected further based on the lidar data.

According to various embodiments, an angle of arrival may be determined based on the radar data cube.

According to various embodiments, the angle of arrival may be detected using an artificial network with a plurality of layers, for example a plurality of fully connected layers.

According to various embodiments, the artificial neural network may further include a dropout layer.

According to various embodiments, the object may be detected further based on a regression subnet.

According to various embodiments, the regression subnet may include at least one of a u-shaped network and a LSTM.

According to various embodiments, the regression subnet may include an ego-motion compensation module.

According to various embodiments, the ego-motion compensation module may carry out ego-motion compensation of an output of a recurrent network of a previous time step and may input the result of the ego-motion compensation into a recurrent network of present time step.

According to various embodiments, the ego-motion compensation module may carry out an interpolation, wherein the interpolation comprises a nearest neighbor interpolation and further comprises recording a residual part of a movement.

Each of the steps 802, 804, 806, 808, 810 and the further steps described above may be performed by computer hardware components.

Figure 9:
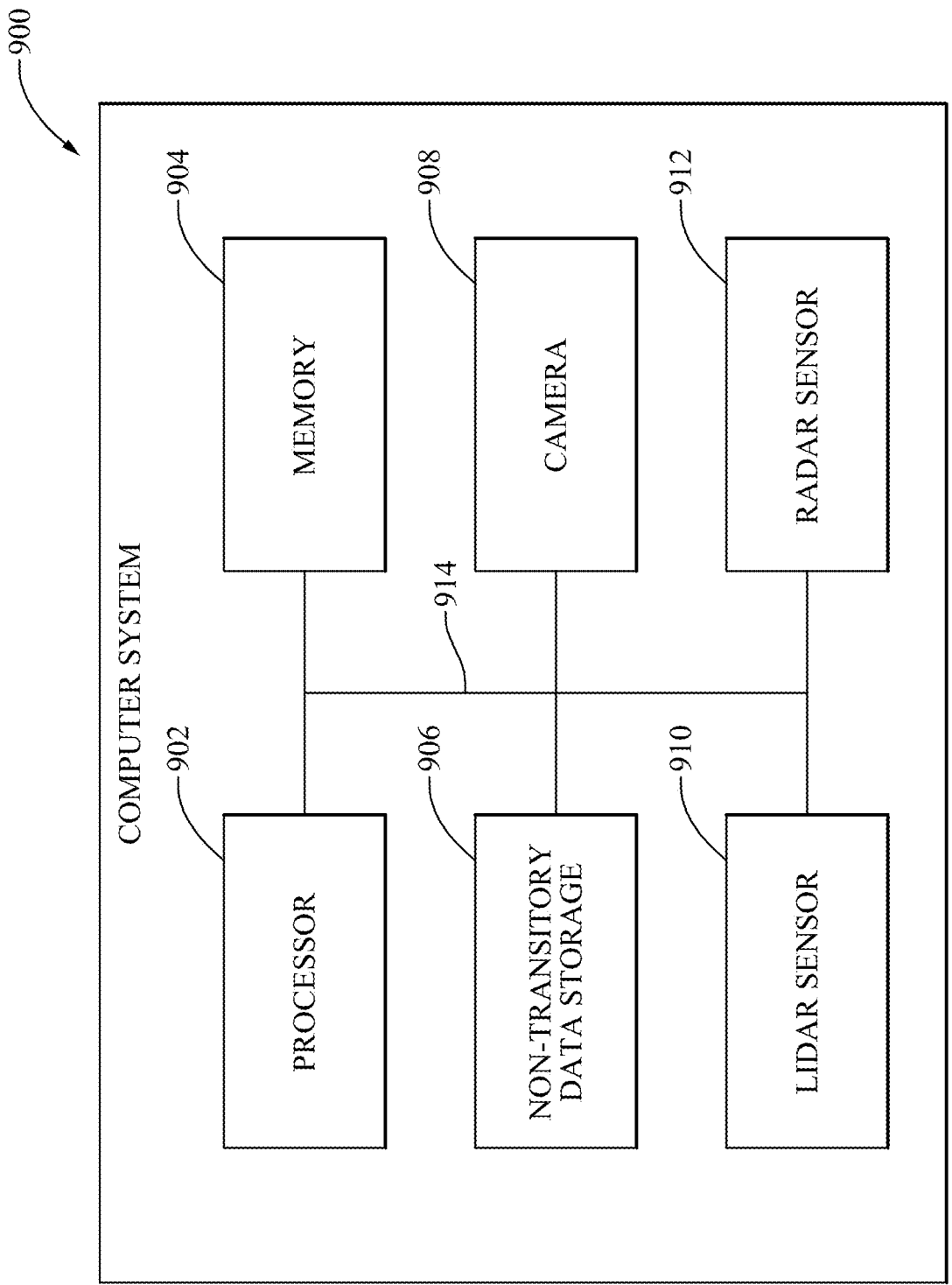
FIG. 9 a computer system with a plurality of computer hardware components configured to carry out steps of a computer implemented method for object detection according to various embodiments.

FIG. 9 shows a computer system 900 with a plurality of computer hardware components configured to carry out steps of a computer implemented method for object detection according to various embodiments. The computer system 900 may include a processor 902, a memory 904, and a non-transitory data storage 906 (also referred to as a non-transitory computer readable medium or storage medium). At least one camera 908, at least one lidar sensor 910, and at least one radar sensor 912 may be provided as part of the computer system 900 (like illustrated in FIG. 9) or may be provided external to the computer system 900.

The processor 902 may carry out instructions provided in the memory 904. The non-transitory data storage 906 may store a computer program, including the instructions that may be transferred to the memory 904 and then executed by the processor 902.

The processor 902, the memory 904, and the non-transitory data storage 906 may be coupled with each other, e.g. via an electrical connection 914, such as e.g. a cable or a computer bus or via any other suitable electrical connection to exchange electrical signals. The at least one camera 908, the at least one lidar sensor 910, and/or the at least one radar sensor 912 may be coupled to the computer system 900, for example via an external interface, or may be provided as parts of the computer system (in other words: internal to the computer system, for example coupled via the electrical connection 914).

The terms "coupling" or "connection" are intended to include a direct "coupling" (for example via a physical link) or direct "connection" as well as an indirect "coupling" or indirect "connection" (for example via a logical link), respectively.

It will be understood that what has been described for one of the methods above may analogously hold true for the computer system 900.

Figure 13:
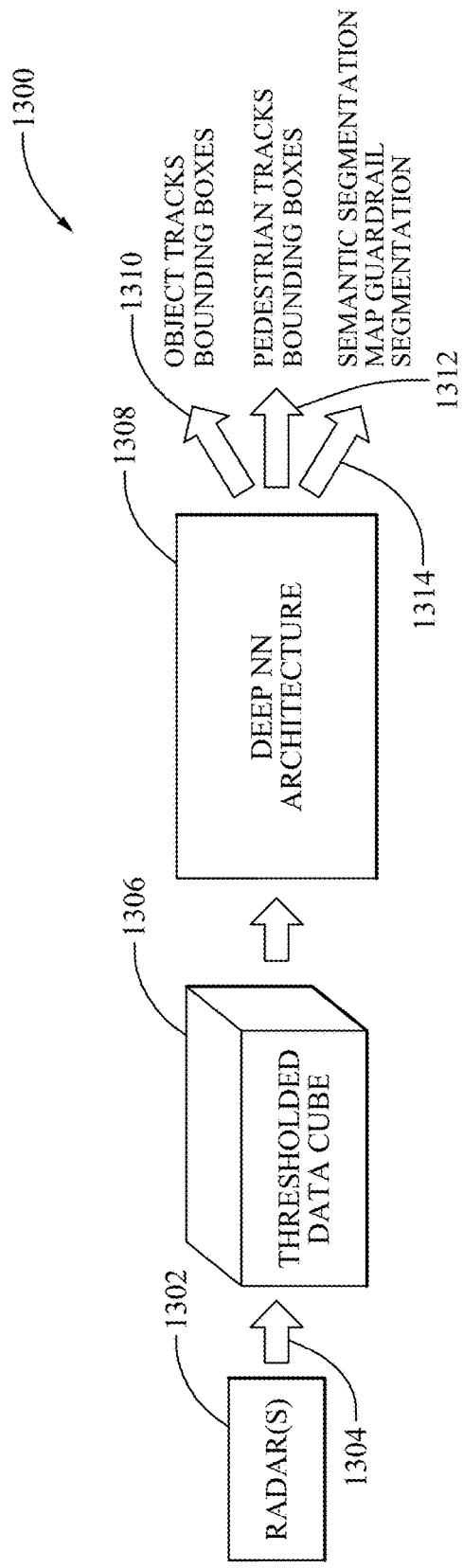
FIG. 13 an illustration of a deep network for radar according to various embodiments.

FIG. 13 shows an illustration 1300 of a deep network for radar (which may be referred to as a Rador net) according to various embodiments. Radar data 1302 (for example raw radar data) may be processed using a 2D FFT (1304) to obtain a thresholded data cube 1306 (for example as illustrated in FIG. 10 and FIG. 11). A deep neural network (NN) architecture 1308 may provide processing, fusion and/or tracking, like will be described in more detail below, in order to obtain object tracks bounding boxes 1310, pedestrian tracks bounding boxes 1312, and/or a semantic segmentation map or guardrail segmentation 1314.

According to various embodiments, the Rador net may provide an end-to-end machine learning based solution including radar preprocessing, fusion of multiple radar sensors, object bounding box generation, and temporal fusion. "End-to-end" in this regard may mean that radar data may be input and the output may be obtained (and the corresponding networks may be trained accordingly) without providing any intermediate learning or reference data.

The machine learning solution according to various embodiments outperforms hand-made methods by a large margin and optimizes each block on the final optimization target rather than specifying human defined intermediate results.

Figure 14:
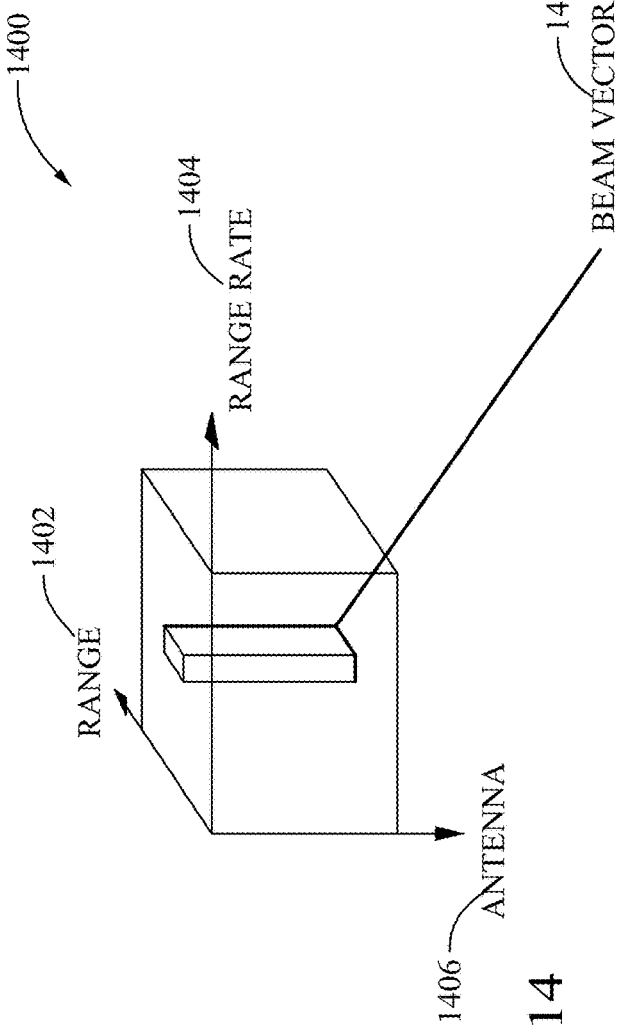
FIG. 14 an illustration of input to the network according to various embodiments.

FIG. 14 shows an illustration 1400 of input to the network according to various embodiments. A range direction 1402, a range rate direction 1404, an antenna direction 1406 are illustrated. A stack of data for a fixed range and a fixed range rate, including data for various antennas, may be referred to as a beam vector 1408 (which may also be referred to as a data cube). In other words, a data cube contains the complex responses of all antennas in the array.

The input data may be a data cube or a thresholded data cube (which may also be called compressed data cube or CDC). The CDC may contain only those beam vectors (and their neighborhood), where a sum over all antennas exceeds a noise threshold (for example CFAR).

Figure 15:
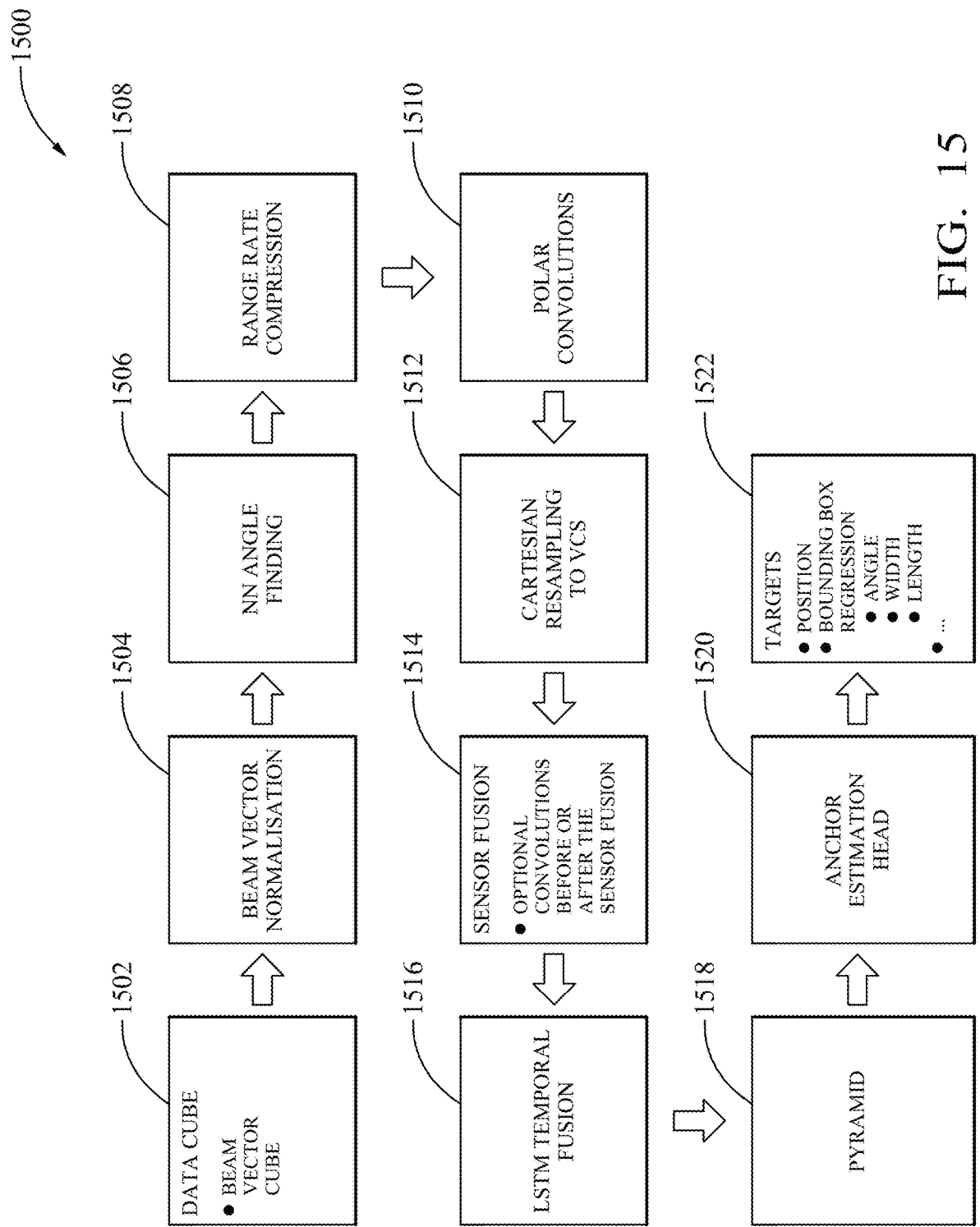
FIG. 15 an illustration of an overview of Rador net according to various embodiments.

FIG. 15 shows an illustration 1500 of an overview of Rador net. A data cube 1502 may be provided to beam vector normalization 1504 (which may remove range dependency), followed by NN angle finding 1506 (which may result in a large cube), followed by range rate compression 1508 (which may reduce the compression using an encoder network where the Doppler data is transformed into a feature layer), followed by polar convolutions 1510 (which may include convolutions in polar coordinates), followed by Cartesian resampling to VCS 1512 (for example in dimensions related to range and angle to a front direction), followed by sensor fusion 1514, followed by LSTM temporal fusion 1516, followed by a pyramidal method 1518, followed by anchor estimation head 1520 (which may estimate for each pixel whether there is an object), in order to provide the targets 1522 (which may for example include positions or bounding box regressions for angle, width, or length).

Figure 16:
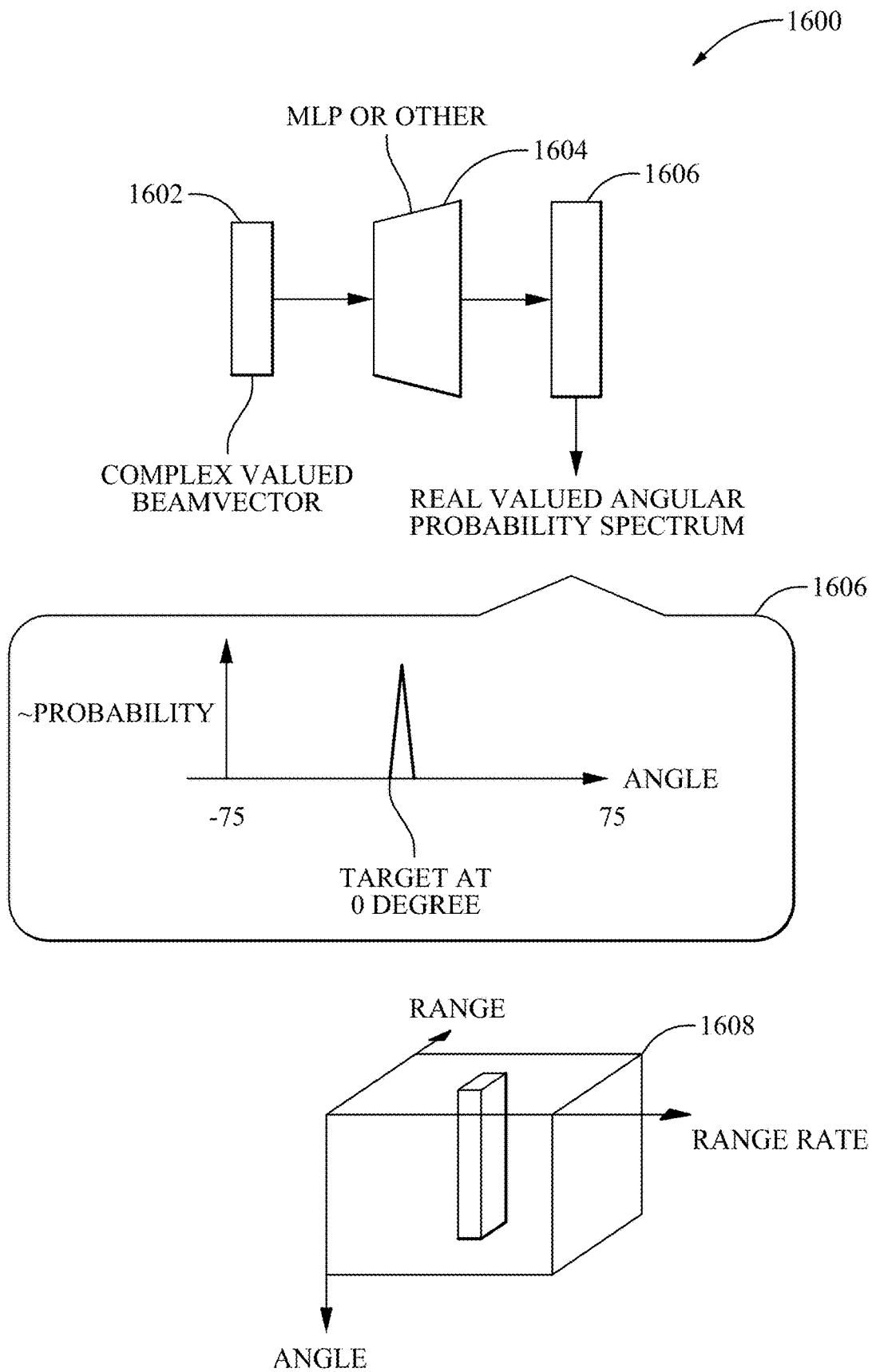
FIG. 16 an illustration of a neural network for angle finding according to various embodiments.

FIG. 16 shows an illustration 1600 of a neural network for angle finding (in other words: for estimation of a direction of arrival). A complex valued beamvector 1602 may be provided to an MLP or another network 1604 to provide a real valued angular probability spectrum 1606. The network 1604 may be a small network that learns the transformation from complex signals originating from each antenna to a real valued angular spectrum representing the chance of target existence for each potential angle of arrival (loosely corresponding to an FFT followed by a frequency to angle transform). No specific modelling of gaps, interpolation or model order may be required. The same network coefficients may be used for each range-Doppler bin and may be used to transform a Range-Doppler-antenna cube into a Range-Doppler-angle cube 1608 (where for example the angle direction may be provided in a resolution of 1 degree).

Figure 17:
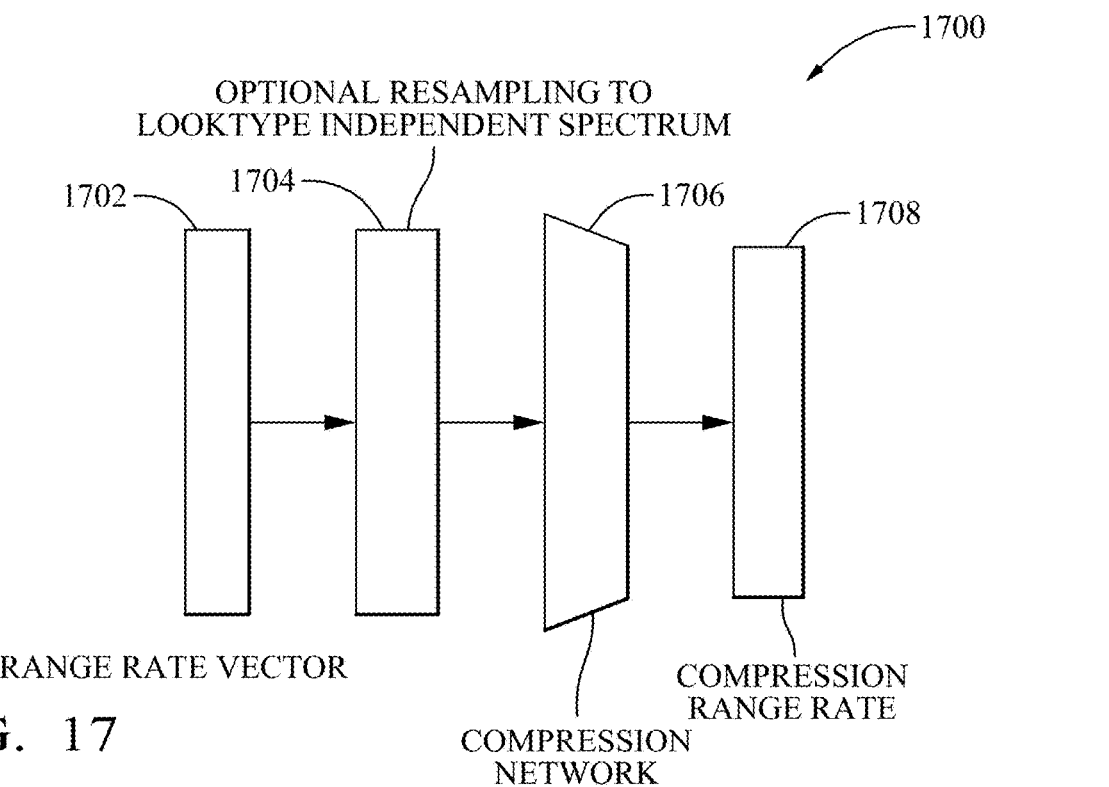
FIG. 17 an illustration of range rate compression according to various embodiments.

FIG. 17 shows an illustration 1700 of range rate compression according to various embodiments. A range rate vector 1702 may be resampled to a looktype independent spectrum 1704. The range rate vector 1702 or the resampled vector may be provided to a compression network 1706 to obtain a compressed range rate 1708. Thus, a data cube of e.g. 512 range rate, 128 range and 150 angle entries, which may be too large to compute may be reduced (in other words: compressed) by the compression network (which may be an encoder network), in order to reduce/compress the cube size along the range rate dimension.

For example, an uncompressed cube: may have 512 range rate entries, 108 range entries, and 150 angle entries, and the corresponding compressed cube may have 20 compressed range rate/feature entries, 108 range entries, and 150 angle entries.

According to various embodiments, a network may be used to make a direct conversion to concrete range rate values and weights.

Regarding the polar convolutions according to various embodiments, 2d convolution layers may be used for signal processing in the polar cube. For some of the layers, different convolution kernels may be used to process data with different looktypes.

Figure 18:
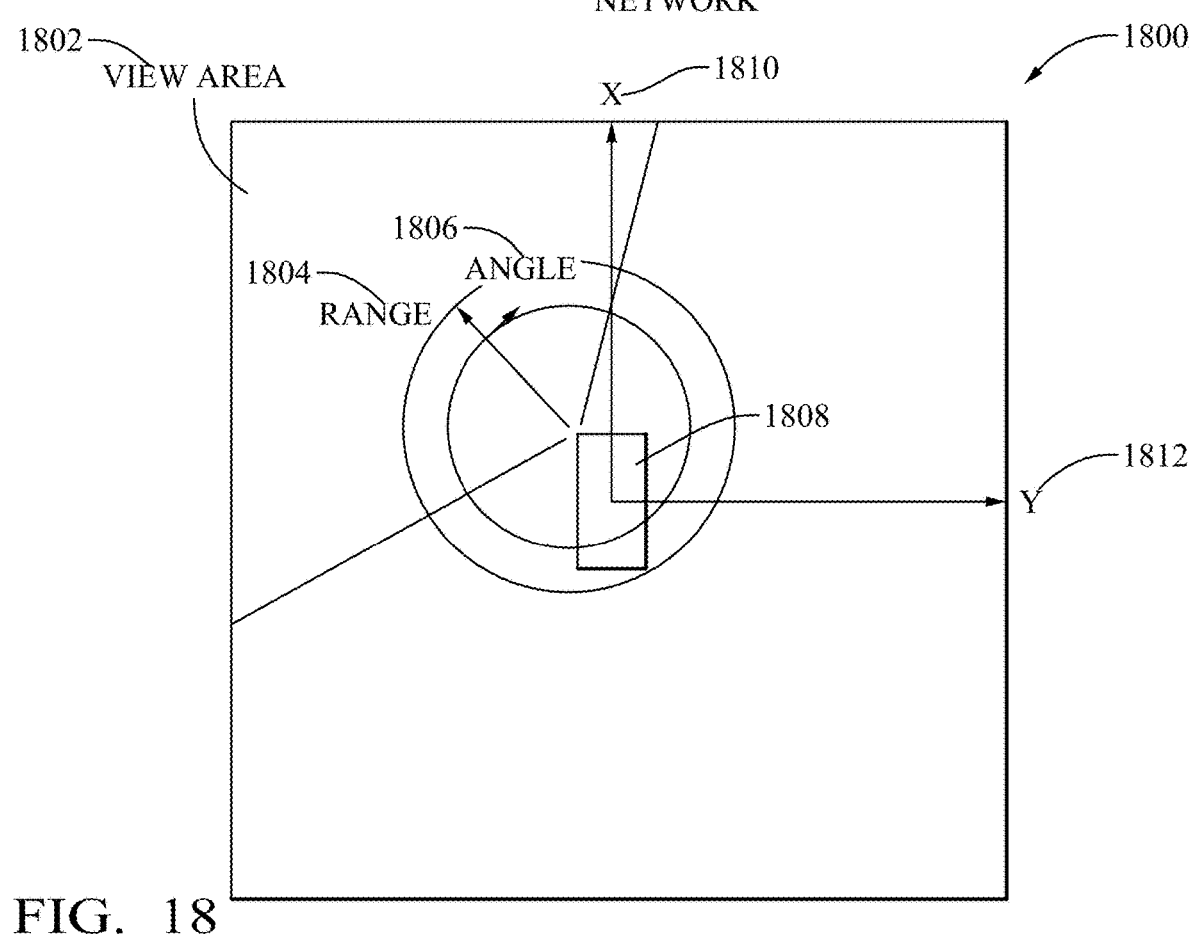
FIG. 18 an illustration of a coordinate conversion according to various embodiments.

FIG. 18 shows an illustration 1800 of a coordinate conversion according to various embodiments, for example a conversion into VCS coordinates. A view area 1802 is shown, in which a sensor coordinate system (in range 1804 and angle 1806) is illustrated. A vehicle 1808 may define coordinates in the VCS (in x direction 1810 and y direction 1812).

The conversion from sensor coordinate system to the vehicle coordinate system (VCS) may be provided within the network structure. The VCS may be a Cartesian 2d/3d coordinate system (x, y, z axis), fixed at a reference point at the vehicle. The sensor coordinate system may be a polar system (range, angle) at the position of the sensor.

For the conversion from the sensor coordinate system to the vehicle coordinate system, each (Doppler) feature channel may be resampled to a Cartesian VCS grid using bilinear interpolation. High resolution may be used in intermediate steps to avoid subsampling issues followed by max pooling resolution reduction. The results of the conversion may be a Cartesian data cube.

Figure 19:
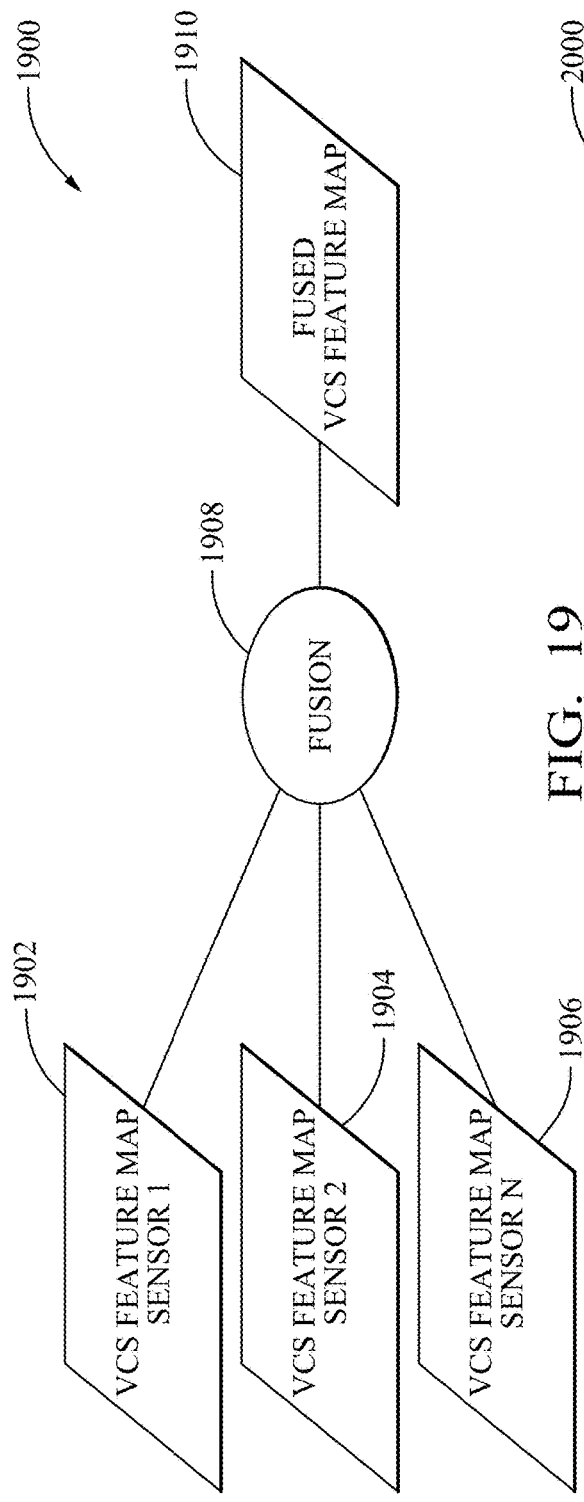
FIG. 19 an illustration of sensor fusion according to various embodiments.

FIG. 19 shows an illustration 1900 of sensor fusion according to various embodiments. VCS feature maps 1902, 1904, 1906 (each one from a different sensor) may be fused (1908) to a fused VCS feature map 1910.

$f_i(j, x, y)$ may denote the j feature map from sensor i. The feature maps may stem from different processed Doppler channels or different sensors. A fused channel $f_{fused}(j, x, y)$ may be generated using $f_{fused}(j, x, y)=f_k(j, x, y)$ for each j, x, y cell, where $$k = \underset{i}{\operatorname{argmax}}|f_i(j, x, y)|.$$

Alternatively, other fusion approaches like e.g.

$$f_{fused}(j, x, y) = \max_{i}|f_i(j, x, y)|$$

may be used.

According to various embodiments, approaches like MLP networks, attention and gating mechanisms or other complex sensor fusion network mechanisms may be used for sensor fusion.

Figure 20:
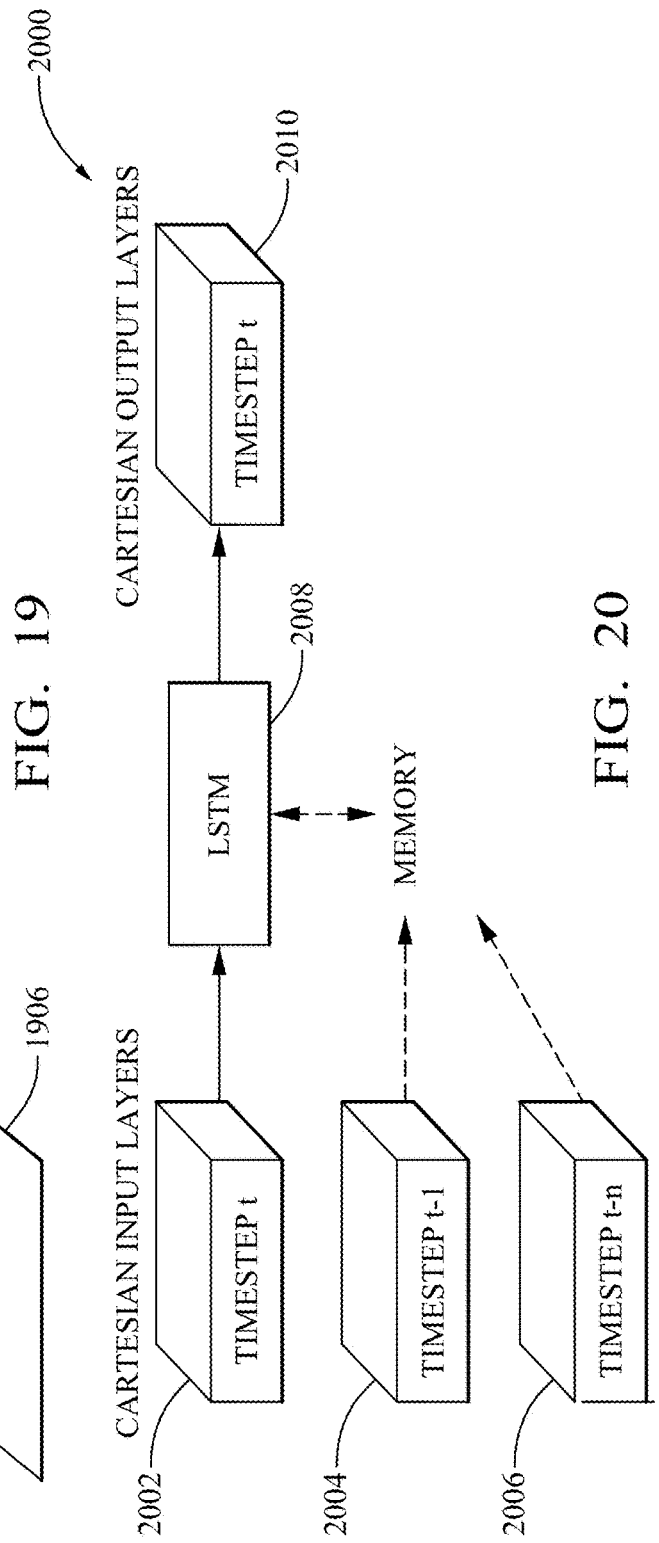
FIG. 20 an illustration of temporal fusion according to various embodiments.

FIG. 20 shows an illustration 2000 of temporal fusion according to various embodiments. Data 2002 from timestep t may be provided to a LSTM 2008, which may also involve data 2004 from timestep t−1 and from further previous timesteps (such as data 2006 from timestep t−n), which may provide a memory to the system. The LSTM 2008 may output data 2010 at timestep t. The input data may be provided as Cartesian input layers, and the output may be provided as Cartesian output layers.

With the temporal fusion according to various embodiments, while one radar scan may be noisy and sparse, a recurrent neuronal network may be applied to fuse/aggregate information 2002, 2004, 2006 from multiple timesteps to generate one output 2010. The convolutional LSTM block 2008 may be used as recurrent neuronal network structure to allow to encode spatial relationships and displacements between timesteps and to avoid the gradient vanishing problem.

According to various embodiments, ego motion compensation may be provided to improve the extraction of slow moving and stationary targets.

Figure 21:
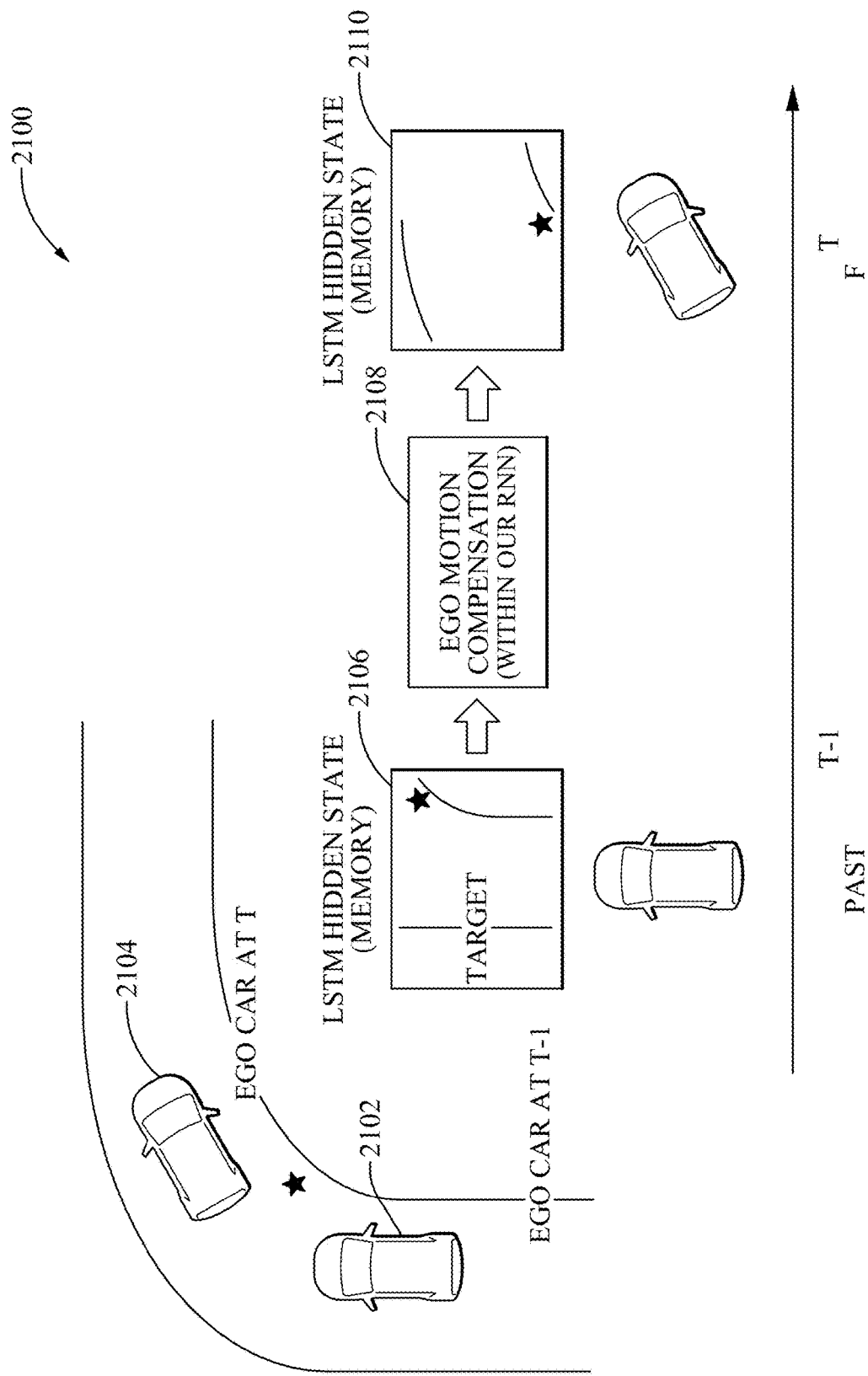
FIG. 21 an illustration of temporal fusion according to various embodiments.

FIG. 21 shows an illustration 2100 of temporal fusion according to various embodiments. A car at time T−1 (2102) may see a target (indicated by a star) at a position relative to its own position (2106), while the same car at time T (2104) may see the same target at time T at a different position relative to its own position (2110). The ego motion compensation block 2108 (which may be provided in the overall network of Rador net) may compensate for the motion of the car between the various time steps.

For example, an ego motion transformer may operate on memory cells, and the network may represent information layers in Cartesian vehicle centered coordinates. Thus, if the vehicle moves, the coordinate system of the memory feature map may also be updated by transforming the memory cells into the coordinate system of the current time step, for example using a bilinear interpolation.

Figure 22:
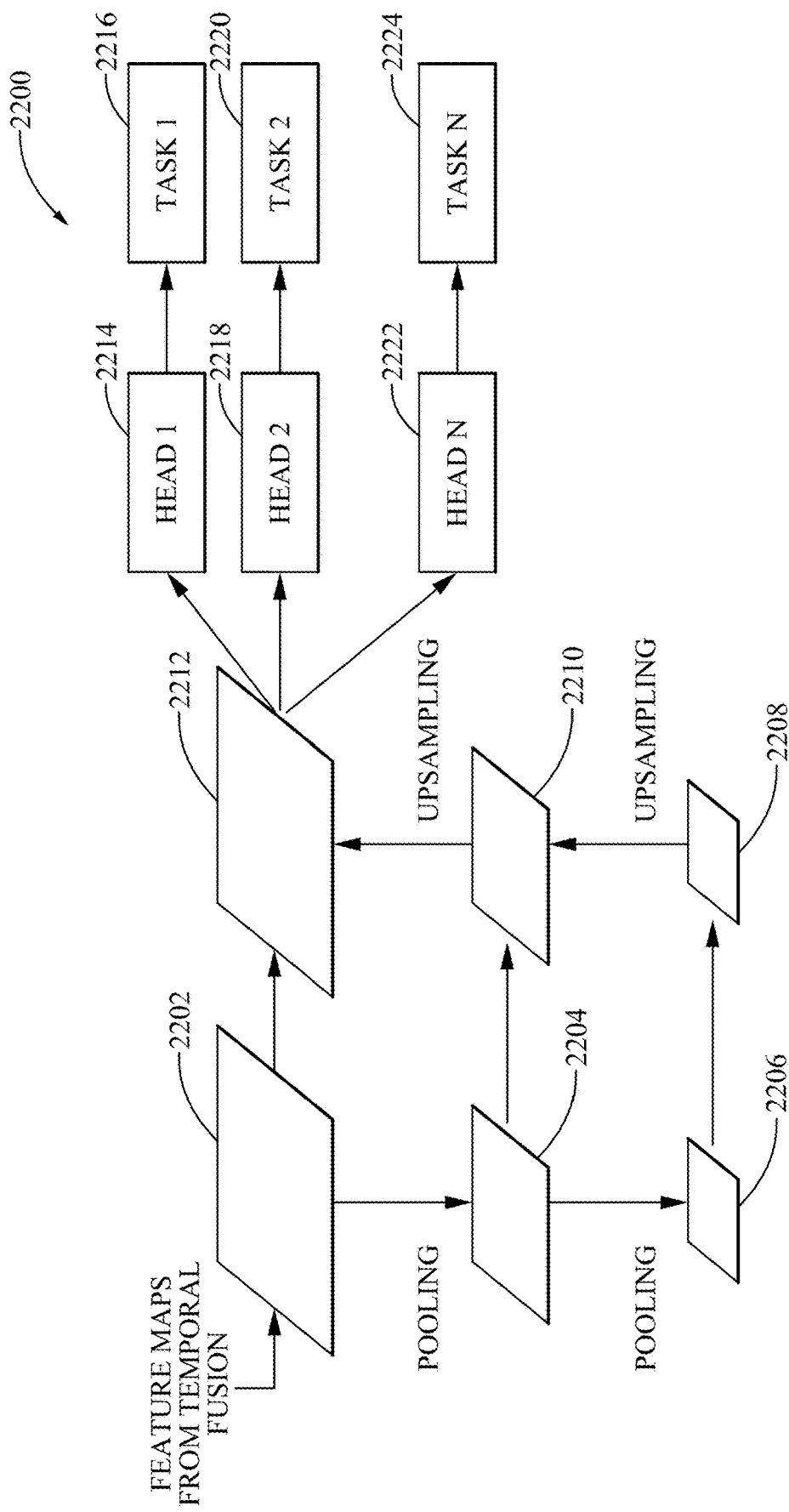
FIG. 22 an illustration of a pyramid structure according to various embodiments.

FIG. 22 shows an illustration 2200 of a pyramid structure according to various embodiments. The pyramid structure may include various layers 2202, 2204, 2206, 2208, 2210, 2212 which may be obtained by pooling and upsampling, and the pyramid structure may be used to extract contextual features. Various heads 2214, 2218, 2222 may be connected to certain pyramid levels and perform specific tasks 2216, 2220, 2224, for example target classification or bounding box regression.

The output of Rador net may include, for each point, a classification of whether the point is a center point for a pedestrian, a vehicle, or a trucks. Furthermore, the output may include a bounding box angle one hot vector direction classification. Regression may be carried out to obtain a bounding box width and height and a speed vector.

For the classification, focal loss may be applied.

Figure 23:
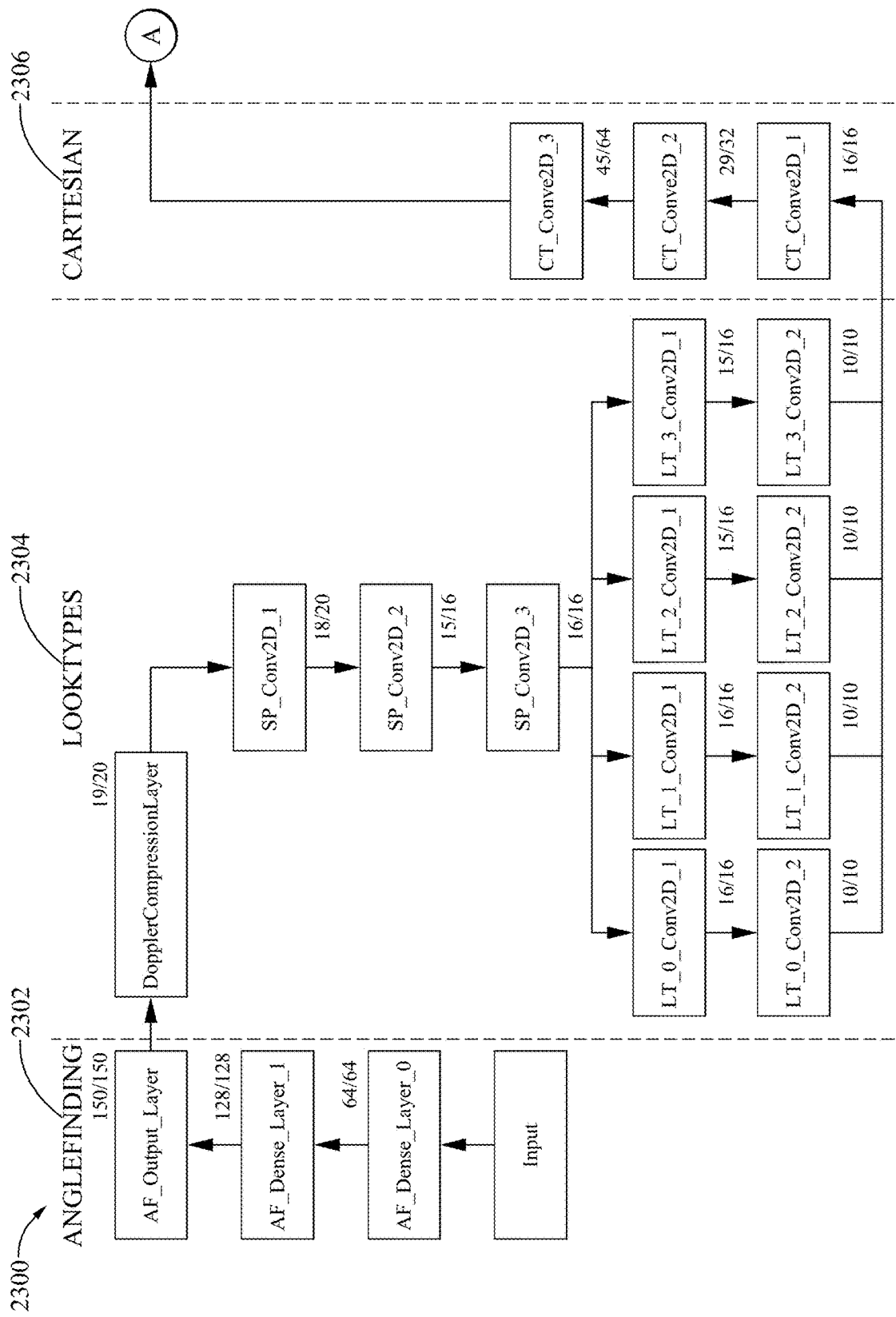
FIG. 23 an illustration of layout of RaDOR Net according to various embodiments.
Figure 23:
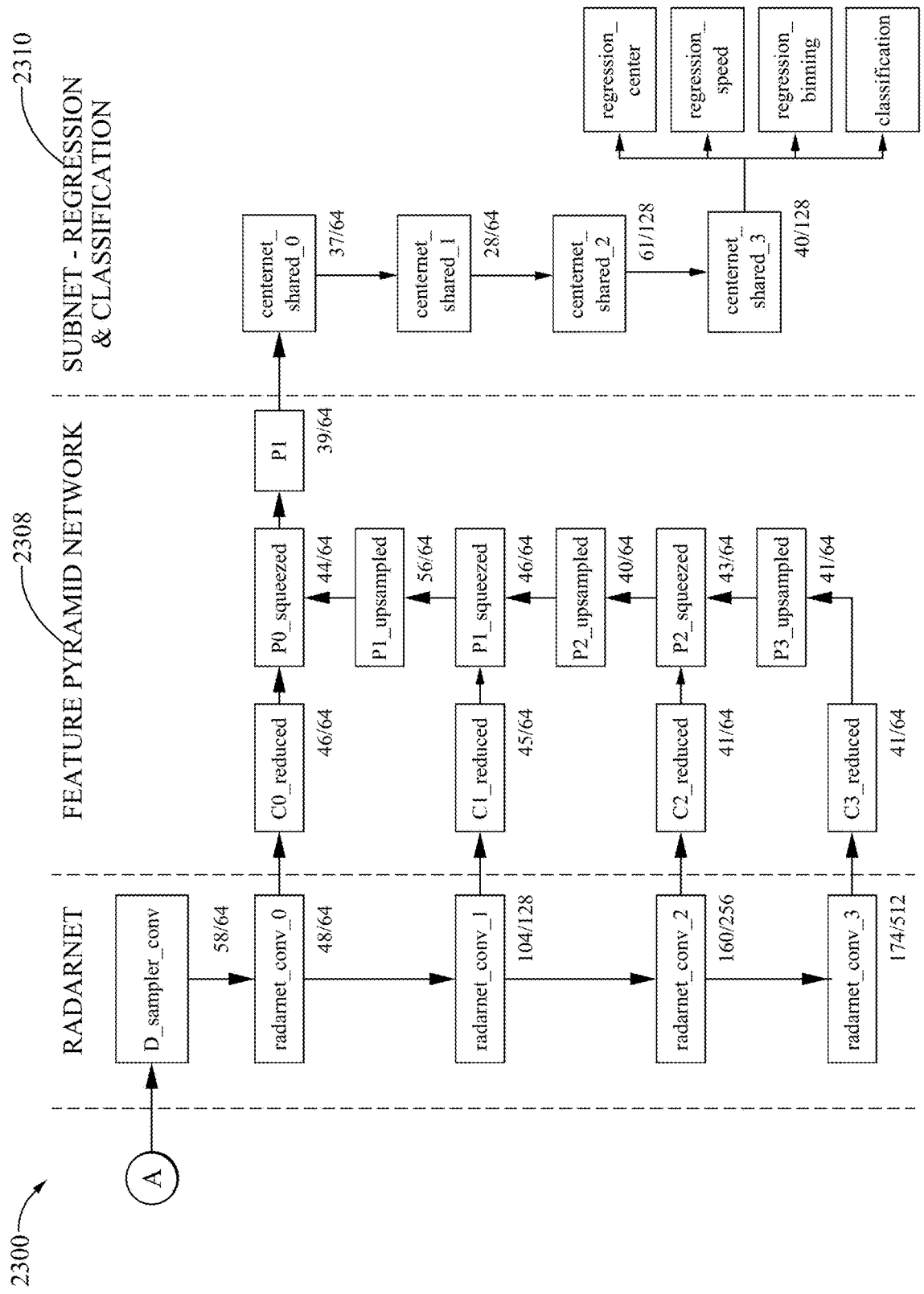

FIG. 23 shows an illustration 2300 of the layout of Rador net. Various blocks are shown. Blocks in a first portion 2302 are related to angle finding. Blocks in a second portion 2304 are related to looktypes, with the top portion being looktype-independent convolutions, and the bottom portion being looktype-dependent convolutions. A third portion 2306 is related to Cartesian processing, providing upsampling. A fourth portion 2308 is related to radar net and provides input to a fifth portion 2310 which provides the feature pyramid network. A sixth portion 2312 provides a sub network for regression and classification.

It will be understood that even though various embodiments and aspects are described with reference to the RadDOR-Net, these embodiments or aspects may be provided without the components of RadDOR-Net (for example the multi-domain direction of arrival estimation neural network and/or the method for ego motion compensation in recurrent networks).

According to various embodiments, a back-network design for rador net may be provided.

According to various embodiments, unified network heads may be provided for improved accuracy and efficiency in object detection, as will be described below.

As described above, deep learning may connect raw data (for example radar data) with high level results using an appropriate architecture. The goal of object detection may be to localize and classify objects in a scene. Additionally, further object properties such as size and rotation may be predicted. The overall network architecture for these tasks is usually build with a shared backbone network which works as a feature extractor. The backbone may be followed by multiple, parallel prediction and regression branches that predict the desired properties like class and size given the extracted features.

Each of those branches may be implemented using a separate neural network with an own set of learnable parameters. This architecture design originates from the field of image-based computer vision and has shown great success. However, when dealing with top-down projected radar data in a cartesian coordinate system, there may be a high correlation between different prediction targets like size and type of object. This architecture design does not leverage the high correlation, which results in an increased need for learnable parameters and calculations, because shared properties have to be learned in the backbone. Those shared properties then have to be (individually) propagated through each relevant network branch. In image-based computer vision, the output space usually incorporates perspective, scale, and distortions, and between these properties, correlations are usually not present, because it does not operate on a regular grid.

Figure 24:
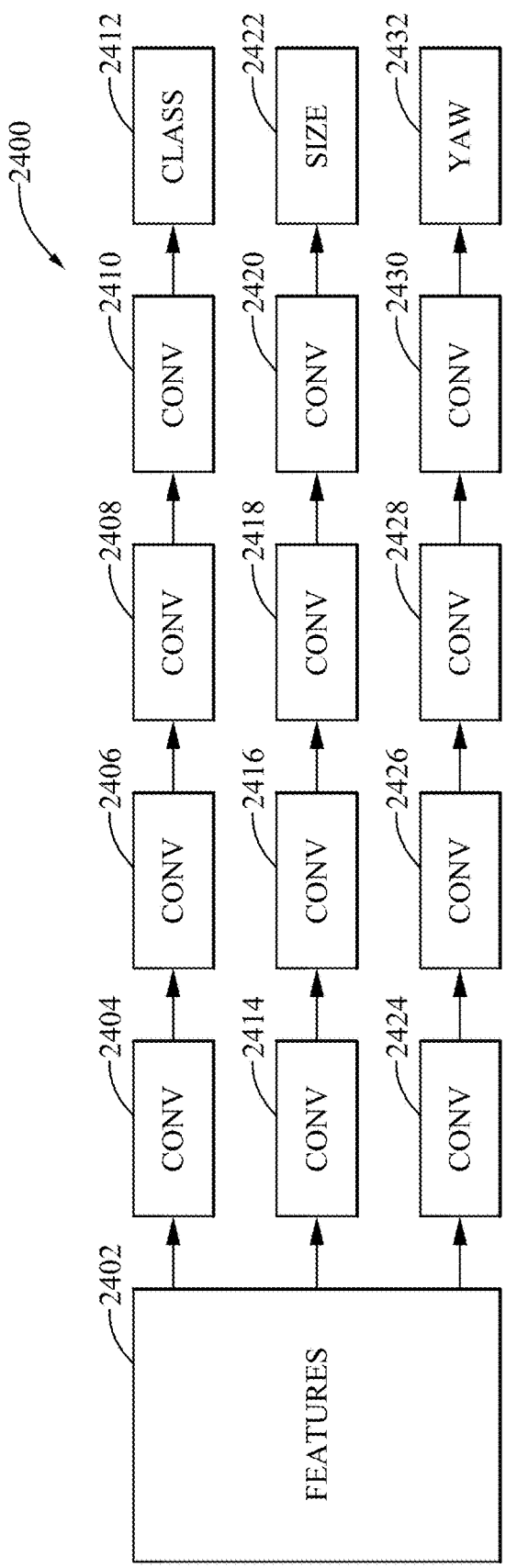
FIG. 24 an illustration of a non-unified detection head.

FIG. 24 shows an illustration 2400 of such non-unified detection heads. A plurality of features 2402 may (in parallel) be provided to a plurality of sequences of convolutional layers. For example, the features 2402 may be provided to the sequence of convolutional layers 2404, 2406, 2408, 2410, and based on the computations of these convolutional layers 2404, 2406, 2408, 2410, one (and only one) property of the object may be determined (for example the class 2412 of the object). Likewise, the features 2402 may be provided to the sequence of convolutional layers 2414, 2416, 2418, 2420, and based on the computations of these convolutional layers 2414, 2416, 2418, 2420, one (and only one) property of the object may be determined (for example the size 2422 of the object). Furthermore, the features 2402 may be provided to the sequence of convolutional layers 2424, 2426, 2428, 2430, and based on the computations of these convolutional layers 2424, 2426, 2428, 2430, one (and only one) property of the object may be determined (for example the yaw (angle) 2432 of the object).

According to various embodiments, the rador net network may be extended with a new back-network design. The core of the extension is a unification of the previously separated network architecture to increase feature sharing, reduce parameters and decrease computational complexity (both during training and during application of the trained network).

The Rador net network may localize and predict objects, their classes as well as a bounding box size, a speed vector, and an orientation in a cartesian grid. Many of those targets may have a high correlation. For example, trucks are usually much larger than cars. Therefore, in this example the object type has a strong correlation with the bounding box size. The same goes for the speed; for example, a walking pedestrian normally does not have a high speed.

According to various embodiments, the problem of not leveraging the high correlation between different object properties may be solved by a new, unified output branch. The unified branch may replace the previously parallel network design (for example the non shared prediction network 2400 of FIG. 24).

Figure 25:
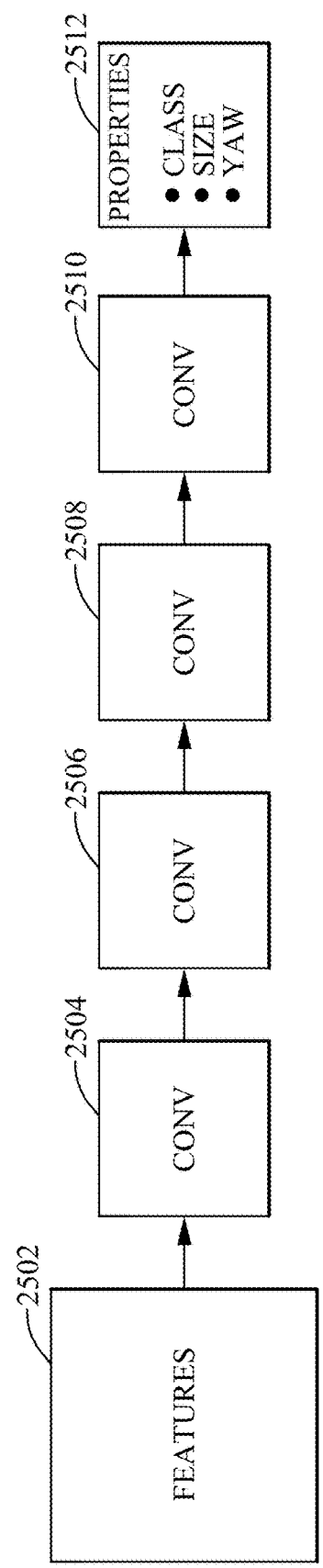
FIG. 25 an illustration of a unified detection head according to various embodiments.

FIG. 25 shows a network 2500 (which may be equivalent to the network 2400 of FIG. 24), but with a unified approach (i.e. with a unified detection head) according to various embodiments. Instead of unshared, separate calculations, according to various embodiments, all output targets 2512 (in other words: properties) are calculated on the same network branch (for example including convolutional layers 2504, 2506, 2508, 2510, which are arranged in sequence, and wherein the first convolutional layer 2504 is provided with features 2502, for example one or more of the various feature maps as described herein).

The structure according to various embodiments (for example as shown in FIG. 25) may provide a high degree of feature sharing for the different targets (in other words: properties) and allows for highly interleaved computations of the object properties. For each target property, the network may use all available information. Simultaneously, this reduces the hyper parameter space for the engineer, because there is no need to manually balance weight and computation between different branches and target properties, as this balance can now be learned (when training the artificial network including the structure of FIG. 25).

Additionally, with the structure according to various embodiments, parameters may be used more efficiently, because those parameters that previously would have been responsible for transporting information through different branches (or different layers which are provided in parallel) may now be used for other calculations. Correlated properties may be combined as early as possible and the optimizer (which is used when training the artificial neural network) is not required to move any of the correlated computations into the backbone.

To further compensate the reduction of parameters, which simply arise from the fact that branches are removed, the parameters in the unified branch may have a higher complexity than a single branch in the old architecture. However, the number of parameters can be still be kept lower than before, because of the increased feature sharing. Furthermore, this procedure does not only reduce parameters and computations, but also jointly improved bounding box regressions and classification accuracy.

It will be understood that although the architecture has been described with focus on the field of object detection, it may also be applied to other topics.

Figure 26:
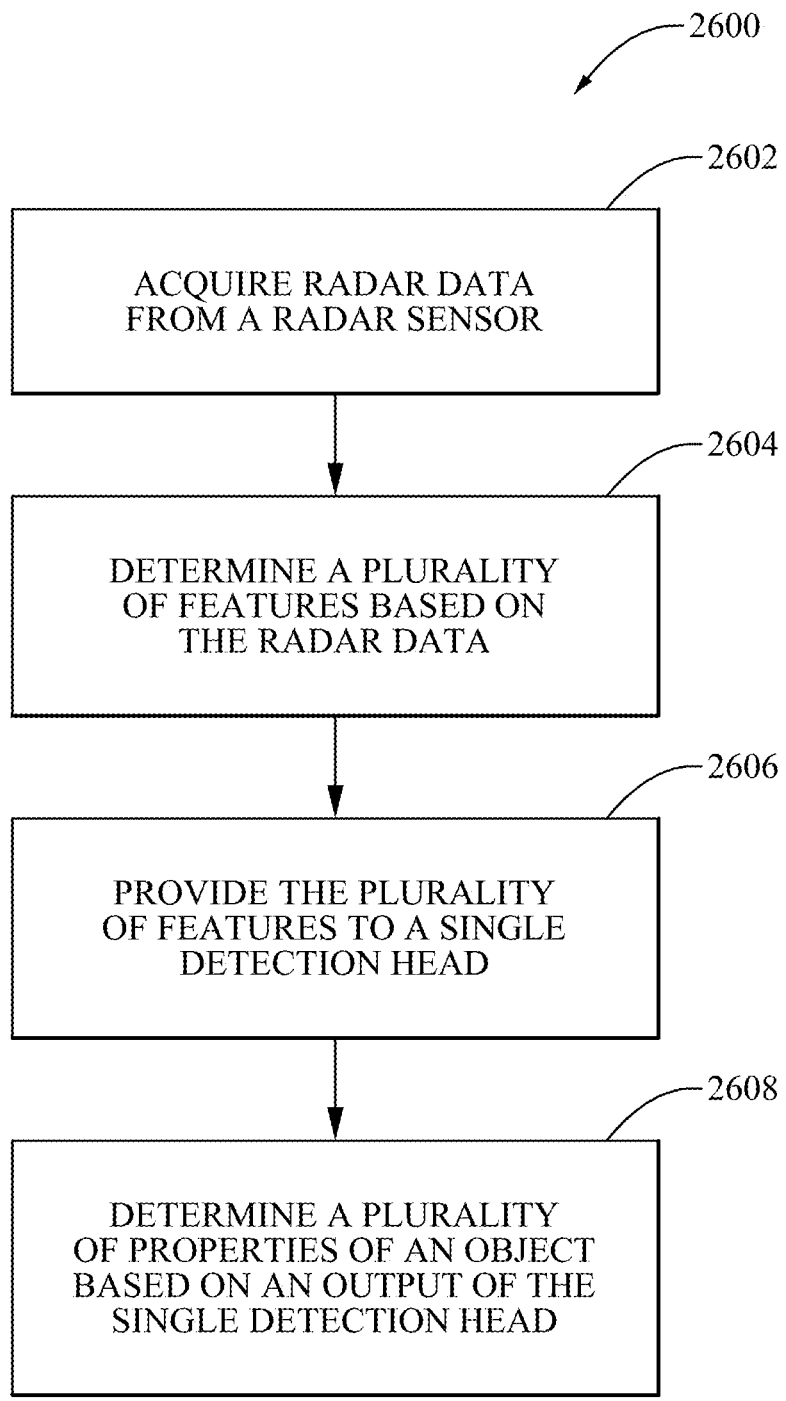
FIG. 26 a flow diagram illustrating a method for detection of objects in a vicinity of a vehicle according to various embodiments.

FIG. 26 shows a flow diagram 2600 illustrating a method for detection of objects in a vicinity of a vehicle according to various embodiments. At 2602, radar data may be acquired from a radar sensor. At 2604, a plurality of features may be determined based on the radar data. At 2606, the plurality of features may be provided to a single detection head. At 2608, a plurality of properties of an object may be detected based on an output of the single detection head.

According to various embodiments, each of the features may be connected to the output of the single detection head.

According to various embodiments, the single detection head may include or may be a plurality of sequentially arranged layers.

According to various embodiments, the single detection head may be free from layers arranged in parallel.

According to various embodiments, the features may be determined using an artificial neural network.

According to various embodiments, the single detection head may be trained for all of the properties simultaneously.

According to various embodiments, the plurality of properties may include or may be at least two of a class of the object, a size of the object, or a yaw angle of the object.

According to various embodiments, the method may further include: determining a radar data cube based on the radar data; providing the radar data cube to a plurality of layers of a neural network; resampling the output of the plurality of layers into a vehicle coordinate system; and determining the plurality of features based on the resampled output.

According to various embodiments, the method may further include fusing data from a plurality of radar sensors, wherein the plurality of features are determined based on the fused data.

According to various embodiments, the method may further include acquiring camera data from a camera, wherein the plurality of features wherein are determined further based on the camera data.

According to various embodiments, the method may further include acquiring lidar data from a lidar sensor, wherein the plurality of features are determined further based on the lidar data.

According to various embodiments, the method may further include determining an angle of arrival based on the radar data.

Each of the steps 2602, 2604, 2606, 2608 and the further steps described above may be performed by computer hardware components.

The following examples pertain to further embodiments.

In Example 1, a computer implemented method for detection of objects in a vicinity of a vehicle comprises the following steps carried out by computer hardware components: acquiring radar data from a radar sensor; determining a radar data cube based on the radar data; providing the radar data cube to a plurality of layers of a neural network; resampling the output of the plurality of layers into a vehicle coordinate system; and detecting an object based on the resampled output.

In Example 2, the computer implemented method of Example 1 further comprises the following steps carried out by the computer hardware components: fusing data from a plurality of radar sensors; and detecting the object further based on the fused data.

In Example 3, the computer implemented method of at least one of Examples 1 to further comprises the following step carried out by the computer hardware components: acquiring camera data from a camera; wherein the object is detected further based on the camera data.

In Example 4, the computer implemented method of at least one of Examples 1 to 3 further comprises the following step carried out by the computer hardware components: acquiring lidar data from a lidar sensor; wherein the object is detected further based on the lidar data.

In Example 5, the computer implemented method of at least one of Example 1 to 4 further comprises the following step carried out by the computer hardware components: determining an angle of arrival based on the radar data cube.

In Example 6, the computer implemented method of Example 5 further comprises that the angle of arrival is determined using an artificial network with a plurality of layers.

In Example 7, the computer implemented method of Example 6 further comprises that the artificial neural network further comprises a dropout layer.

In Example 8, the computer implemented method of at least one of Examples 1 to 7 further comprises that the object is detected further based on a regression subnet.

In Example 9, the computer implemented method of Example 8 further comprises that the regression subnet comprises at least one of a u-shaped network and a LSTM.

In Example 10, the computer implemented method of at least one of Examples 8 or 9 further comprises that the regression subnet comprises an ego-motion compensation module.

In Example 11, the computer implemented method of Example 10 further comprises that the ego-motion compensation module carries out ego-motion compensation of an output of a recurrent network of a previous time step, and inputs the result of the ego-motion compensation into a recurrent network of present time step.

In Example 12, the computer implemented method of at least one of Examples 10 or 11 further comprises that the ego-motion compensation module carries out an interpolation, wherein the interpolation comprises an nearest neighbor interpolation and further comprises recording a residual part of a movement.

In Example 13, a computer system comprises a plurality of computer hardware components configured to carry steps of out the computer implemented method of at least one of Examples 1 to 12.

In Example 14, a vehicle comprises the computer system of Example 13 and the radar sensor.

In Example 15, a non-transitory computer readable medium comprises instructions for carrying out the computer implemented method of at least one of Examples 1 to 12.

What is claimed is:

1. A method, comprising:
   detecting, using computer hardware components of a vehicle, objects in a vicinity of a vehicle by:
   acquiring radar data from a radar sensor;
   determining a plurality of features based on the radar data;
   providing the plurality of features to a single detection head that comprises a plurality of sequentially arranged layers, the single detection head being free from layers arranged in parallel;
   determining a plurality of properties of each object based on an output of the single detection head;
   carrying out, with an ego-motion compensation module, a nearest neighbor interpolation to determine a new position of each object in a current time step and avoiding drift due to an accumulation of positional errors in positions of the objects over time by recording a residual part indicating a positional error of a movement of each object from the current time step;
   determining the new position of each object based on a transformation grid from the current time step and a previous residual part for each object from a previous time step;
   determining a subsequent position of each object in a subsequent time step based on the recorded residual part for each object; and
   detecting the objects based on a regression subnet comprising the ego-motion compensation module; and
   controlling, by an autonomous driving system of the vehicle, autonomous driving of the vehicle based on the plurality of properties of each object.

2. The method of claim 1,
   wherein each of the plurality of features is connected to an input of the single detection head.

3. The method of claim 1,
   wherein the plurality of features are determined using an artificial neural network.

4. The method of claim 1,
   wherein the single detection head is trained for the plurality of properties simultaneously.

5. The method of claim 1,
   wherein the plurality of properties comprises at least two of a class of the object, a size of the object, or a yaw angle of the object.

6. The method of claim 1, wherein detecting the objects in the vicinity of the vehicle further comprises:
   determining a radar data cube based on the radar data;
   providing the radar data cube to a plurality of layers of a neural network;
   resampling the output of the plurality of layers into a vehicle coordinate system; and
   determining the plurality of features based on the resampled output.

7. The method of claim 1, wherein detecting the objects in the vicinity of the vehicle further comprises:
   fusing data from a plurality of radar sensors including the radar sensor; and
   determining the plurality of features further based on the fused data.

8. The method of claim 1, wherein detecting the objects in the vicinity of the vehicle further comprises:
   acquiring camera data from a camera;
   wherein the plurality of features are determined further based on the camera data.

9. The method of claim 1, wherein detecting the objects in the vicinity of the vehicle further comprises:
acquiring lidar data from a lidar sensor; and
determining the plurality of features further based on the lidar data.

10. The method of claim 1, wherein detecting the objects in the vicinity of the vehicle further comprises determining an angle of arrival based on the radar data.

11. The method of claim 10, wherein the angle of arrival is determined using an artificial neural network with a plurality of layers.

12. The method of claim 11, wherein the artificial neural network further comprises a dropout layer.

13. The method of claim 1, wherein the regression subnet further comprises at least one of a u-shaped network, or a LSTM.

14. The method of claim 1, wherein the ego-motion compensation module is configured to carry out ego-motion compensation of an output of a recurrent network of the previous time step, and input the result of the ego-motion compensation into a recurrent network of the current time step.

15. A system comprising a plurality of computer hardware components configured to:
detect objects in a vicinity of a vehicle by:
acquiring radar data from a radar sensor;
determining a plurality of features based on the radar data;
providing the plurality of features to a single detection head that comprises a plurality of sequentially arranged layers, the single detection head being free from layers arranged in parallel;
determining a plurality of properties of each object based on an output of the single detection head;
carrying out, with an ego-motion compensation module, a nearest neighbor interpolation to determine a new position of each object in a current time step and avoiding drift due to an accumulation of positional errors in positions of the objects over time by recording a residual part indicating a positional error of a movement of each object from the current time step;
determining the new position of each object based on a transformation grid from the current time step and a previous residual part for each object from a previous time step;
determining a subsequent position of each object in a subsequent time step based on the recorded residual part for each object; and
detecting the objects based on a regression subnet comprising the ego-motion compensation module; and
control autonomous driving of the vehicle based on the plurality of properties of each object.

16. A vehicle comprising the system of claim 15.

17. A non-transitory computer readable medium comprising instructions that, when executed, configure a plurality of computer hardware components to:
detect objects in a vicinity of a vehicle by:
acquiring radar data from a radar sensor;
determining a plurality of features based on the radar data;
providing the plurality of features to a single detection head that comprises a plurality of sequentially arranged layers, the single detection head being free from layers arranged in parallel;
determining a plurality of properties of each object based on an output of the single detection head;
carrying out, with an ego-motion compensation module, a nearest neighbor interpolation to determine a new position of each object in a current time step and avoiding drift due to an accumulation of positional errors in positions of the objects over time by recording a residual part indicating a positional error of a movement of each object from the current time step;
determining the new position of each object based on a transformation grid from the current time step and a previous residual part for each object from a previous time step;
determining a subsequent position of each object in a subsequent time step based on the recorded residual part for each object; and
detecting the objects based on a regression subnet comprising the ego-motion compensation module; and
control autonomous driving of the vehicle based on the plurality of properties of each object.

18. The system of claim 15, wherein each of the features is connected to an input of the single detection head.

19. The system of claim 15, wherein the single detection head is trained for the plurality of properties simultaneously.

* * * * *